United States Patent [19]

Brinduse et al.

[11] Patent Number: 4,743,300
[45] Date of Patent: May 10, 1988

[54] POLYFLUOROPOLYETHERS HAVING PENDANT PERFLUOROALKOXY GROUPS

[75] Inventors: Steven P. Brinduse, Minneapolis; Anthony B. Clinch, Woodbury; Daniel K. McIntyre, St. Paul; Allen L. Noreen, Lake Elmo; Mark J. Pellerite, Woodbury, all of Minn.

[73] Assignee: Minnesota Mining and Manufacturing Company, St. Paul, Minn.

[21] Appl. No.: 902,315

[22] Filed: Aug. 29, 1986

[51] Int. Cl.$^4$ .................. B28B 7/36; C07C 179/02
[52] U.S. Cl. .................. 106/38.22; 106/287.23; 558/283; 568/560
[58] Field of Search .................. 558/283; 106/38.22, 106/287.23; 568/560

[56] References Cited

U.S. PATENT DOCUMENTS

| | | | |
|---|---|---|---|
| 3,114,778 | 12/1963 | Fritz et al. | 260/614 |
| 3,291,843 | 12/1966 | Fritz et al. | 260/614 |
| 3,392,097 | 7/1968 | Gozzo et al. | 204/159.22 |
| 3,423,364 | 1/1969 | Kowanko | 260/63 |
| 3,442,942 | 5/1969 | Sianesi et al. | 260/544 |
| 3,450,611 | 6/1969 | Loffelholz et al. | 204/158 |
| 3,451,907 | 6/1969 | Sianesi et al. | 204/158 |
| 3,451,908 | 6/1969 | Sianesi et al. | 204/158 |
| 3,622,635 | 11/1971 | Gozzo et al. | 260/615 A |
| 3,699,145 | 10/1972 | Sianesi et al. | 260/463 |
| 3,715,378 | 2/1973 | Sianesi et al. | 260/463 |
| 3,721,696 | 3/1973 | Sianesi et al. | 260/463 |
| 3,810,874 | 5/1974 | Mitsch et al. | 260/75 H |
| 3,810,875 | 5/1974 | Rice et al. | 260/899 |
| 3,845,051 | 10/1974 | Zollinger | 260/248 CS |
| 3,849,504 | 11/1974 | Mitsch | 260/615 BF |
| 3,896,167 | 7/1975 | Sianesi et al. | 260/544 F |
| 3,950,588 | 4/1976 | McDougal | 428/288 |
| 3,972,856 | 8/1976 | Mitsch et al. | 260/77.5 AP |
| 4,003,941 | 1/1977 | Crawford et al. | 260/463 |
| 4,085,137 | 4/1978 | Mitsch et al. | 260/561 HL |
| 4,094,911 | 6/1978 | Mitsch et al. | 260/615 A |
| 4,451,646 | 5/1984 | Sianesi et al. | 528/401 |
| 4,472,480 | 9/1984 | Olson | 428/332 |
| 4,500,739 | 2/1985 | Caporiccio et al. | 568/677 |
| 4,567,073 | 1/1986 | Larson et al. | 428/40 |

FOREIGN PATENT DOCUMENTS 8430583 7/1969 European Pat. Off. .

OTHER PUBLICATIONS

Chapter II "Photochemistry" by Calvert and Pitts, John Wiley & Sons (1966).
Lee and Neville "Epoxy Resins", pp. 36–140, McGraw-Hill Book Co., NY 1957.

Primary Examiner—Theodore Morris
Attorney, Agent, or Firm—D. M. Sell; J. A. Smith; C. Truesdale

[57] ABSTRACT

Normally liquid peroxidic poly(perfluorooxyalkylene) compositions comprising a mixture of peroxidic poly(perfluorooxyalkylene) compounds, derivatives of the poly(perfluorooxyalkylene) compositions comprising a mixture of non-peroxidic polyfluoropolyether compounds, and derivatives of the polyfluoropolyether compositions comprising functional and non-functional derivatives of the polyfluoropolyether compositions are provided. Each peroxidic poly(perfluorooxyalkylene) compound comprises a backbone of randomly distributed perfluorooxyalkylene units, represented by the formulas $-CF_2O-$,

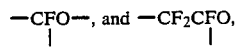

and $-O-$, which when bonded to and $-O-$ of any of the perfluorooxyalkylene units, forms a peroxy group, $-O-O-$, which imparts the peroxidic characteristics to the material, and backbone-pendant perfluoroalkoxy groups or perfluoroalkoxy groups substituted with one or more ether oxygen atoms, the terminal ether oxygen atoms of which are bonded to carbon atoms of the

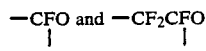

backbone units.

30 Claims, No Drawings

POLYFLUOROPOLYETHERS HAVING PENDANT PERFLUOROALKOXY GROUPS

This invention relates to poly(perfluorooxyalkylene) compositions, to polyfluoropolyether compositions, to derivatives and polymers thereof, to processes for preparing same, and to articles formed therefrom.

In the perfluoropolyether art, U.S. Pat. No. 3,291,843 (Fritz et al.) discloses perfluoroalkyl perfluorovinyl ethers which have been prepared and polymerized to homopolymers and copolymerized with other ethylenically-unsaturated monomers to copolymers. These polyfluoro polymers and copolymers are solids and have a backbone structure of carbon-to-carbon bonds with pendant perfluoroalkoxy groups.

Later in the art, compounds were disclosed that have a backbone structure of repeating perfluorooxyalkylene units which are prepared by the reaction, in the presence of suitable radiation, of oxygen with tetrafluoroethylene (U.S. Pat. Nos. 3,392,097 (Gozzo et al.), 3,622,635 (Gozzo et al.); and 3,715,378 (Sianesi et al.)), hexafluoropropylene (U.S. Pat. Nos. 3,451,908 (Sianesi et al.), 3,699,145 (Sianesi et al); 3,721,696 (Sianesi et al.) and 3,896,167 (Sianesi et al.)), mixtures of one or more perfluoroolefins (U.S. Pat. Nos. 3,442,942 (Sianesi et al.) and 3,450,611 (Loffelholz et al.)), or perfluorodienes (U.S. Pat. No. 3,451,907 (Sianesi et al.)) or by reaction of ozone with perfluoroolefins (U.S. Pat. No. 4,003,941 (Crawford et al.)) or perfluoroolefins and perfluorocarbonyl compounds (U.S. Pat. No. 3,423,364 (Kowanko)). Although these compounds have a backbone structure of repeating perfluorooxyalkylene units that can have pendant groups, these pendant groups are limited to perfluoroalkyl, perfluoroalkenyl, carbonyl fluoride, and perfluoroepoxy groups.

Fluorine-containing block copolymers having a backbone structure of repeating perfluorooxyalkylene units and also pendant perfluoro oxygen-containing groups are described in U.S. Pat. No. 3,810,875 (Rice et al). These copolymers are prepared by contacting a diacyl chloride-terminated poly(perfluoroalkylene oxide) with sodium peroxide to produce a diacyl peroxide of the poly(perfluoroalkylene oxide) which is then used to initiate the polymerization of ethylenically-unsaturated compounds, including, among many ethylenically-unsaturated compounds, the completely fluorinated vinyl ethers. Block polymers prepared in this manner, although having pendant, perfluoro, oxygen-containing groups, have these groups attached in the polymer to a backbone chain of carbon-to-carbon atoms that does not contain ether oxygen.

U.S. Pat. No. 3,849,504 (Mitsch) discloses perfluoropolyethers having end group functionalities greater than two and backbone segments of repeating units of the formula $(C_mF_{2m})O(C_nF_{2n})$, (1a) and, optionally, random segments of repeating units of the formula $(C_pF_{2p})$, (1b), where m, n and p are each a positive whole number of from, and including, 1 through 7, and further, optionally, one or more random branched segments of the formula

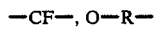

(1c), where R is a side chain of repeating units which have the formula (1a) or a mixed side chain made up of random repeating units having the formulas (1a) and (1b) and R itself can have one or more branched segments as shown in formula (1c). These perfluoropolyethers are prepared by irradiating oxydi(perfluoroacyl fluorides) of the general formula $FOC[(C_mF_{2m})O(C_nF_{2n})]COF$ where m and n are as defined above, with ultraviolet light. The oxydi(perfluoroacyl fluorides) can be optionally admixed together with perfluorodiacyl fluorides of the general formula $FOC(C_pF_{2p})COF$ where p is as defined above.

U.S. Pat. No. 4,451,646 (Sianesi et al.) discloses high molecular weight, polymeric, perfluorinated copolyethers which have a chain structure of $-CF_2-CF_2-O-$ and $-CF_2-O-$ repeating units. These polymeric perfluorinated copolyethers have molecular weights of from 22,000 to 75,000, a ratio of $-CF_2-CF_2-O-$ units to $-CF_2-O-$ units of 0.2 to 25, and an average sum of repeating units along the chain of 220 to 624. These polymeric, perfluorinated copolyethers are prepared by reacting molecular oxygen with tetrafluoroethylene dissolved in a fluorinated or chlorofluorinated solvent under specified conditions of tetrafluoroethylene/oxygen ratio, temperature, pressure, and U.V. radiation levels.

U.S. Pat. No. 4,500,739 (Caporiccio et al.) discloses perfluoropolyethers having in the polymeric chain at least three different alkylene units linked to each other through etheric bridges and arranged by a random distribution along the polymer chain. Two of the units, consisting of $-CF_2-$ and $-C_2F_4-$, are those resulting from the photo-oxidation of $C_2F_4$ and pre-existed in the structure of the peroxidic precursor, while the third alkylene unit consists of three or more carbon atoms and is introduced into the chain by reacting a fluoroolefin with the peroxidic precursor. The fluoroolefins, such as hexafluoropropene, 1-hydropentafluoropropene-1, 2-hydropentafluoropropene-1, perfluoromethylvinylether, perfluoropropylvinylether, 4-trifluoromethyl-3,6-dioxaperfluoroheptene-1, 4,6-dioxaperfluoroheptene-1, cycloperfluorobutene, perfluorobutadiene, and trifluorobromoethylene, are reacted with the radicals of the perfluoroalkoxidic type, generated by the fission of the peroxidic $-O-O-$ bond, or they react with the radicals of the perfluoroalkylenic type coming from the immediate metathesis of perfluoroalkoxidic radicals through the β-scission mechanism. This insertion of the fluoroolefin forms chain segments having three or four caternary carbon atoms.

Polyfunctional poly(perfluoroalkylene oxides), their preparation and their use in the preparation of polymers are disclosed in U.S. Pat. No. 3,810,874 (Mitsch et al.). The compounds described are linear, polyfunctional-terminated poly(perfluoroalkylene oxide) compounds of the formula

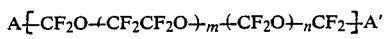

where A and A' are terminal reactive radicals bonded to a connecting $-CF_2-$ group (as shown) and m and n designate the number of randomly distributed perfluoroethyleneoxy and perfluoromethyleneoxy backbone repeating subunits, respectively. The ratio m/n is 0.2/1 to 5/1 and the compounds have a number average molecular weight in the range of 500 to 20,000 or higher, preferably 800 to 15,000. Mitsch et al. disclose that the polymers that can be prepared from the polyfunctional-terminated poly(perfluoroalkylene oxides) have unexpectedly low glass transition temperatures, are flexible at low temperature, and possess solvent resistance and good hydrolytic, thermal, and oxidative stability.

This invention provides, in one aspect, normally liquid peroxidic poly(perfluorooxyalkylene) composition comprising a mixture of peroxidic poly(perfluorooxyalkylene) compounds, each compound comprising, or consisting essentially of, a backbone, or chain, of randomly distributed, perfluorooxyalkylene units represented by the formulas —CF$_2$O—,

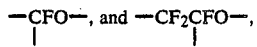

the depicted carbon and oxygen atoms of which are caternary backbone atoms, and —O—, which, when bonded to an —O— of any of the perfluorooxyalkylene units, forms a peroxy group, —O—O—, which imparts the peroxidic characteristics to the composition, and backbone-pendant perfluoroalkoxy groups or perfluoroalkoxy groups substituted with one or more ether oxygen atoms, the terminal ether oxygen atoms of which are bonded to carbon atoms of the

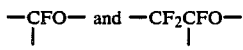

backbone units, and functional or non-functional groups, e.g., —COF or —CF$_3$, terminating said backbone, which backbone can have a wide range of number average molecular weights, e.g., 1000 to 1,000,000, or more, with the terminal groups having effect on composition properties at higher molecular weights. In another aspect, this invention provides derivatives of the poly(perfluorooxyalkylene) compositions comprising a mixture of non-peroxidic polyfluoropolyether compounds. In a further aspect, this invention provides functional and non-functional derivatives of the non-peroxidic polyfluoropolyether compositions. In another aspect, this invention provides polymers of the functional polyfluoropolyether compositions. In a further aspect, this invention provides a process for preparing the peroxidic poly(perfluorooxyalkylene) in compositions involving photooxidation of a mixture of perfluoroolefins and perfluoro(alkyl vinyl) ethers in the presence of oxygen. In a still further aspect, this invention provides articles produced from the functional polyfluoropolyether compositions.

As used herein in describing our invention, the term "perfluoroalkoxy" is a term generic to unsubstituted perfluoroalkoxy groups having a single terminal oxygen atom, such as CF$_3$O—, CF$_3$CF$_2$O—, C$_6$F$_{11}$O—, and the like, and perfluoroalkoxy groups substituted with one or more further ether oxygen atoms, such as CF$_3$O—CF$_2$O—, CF$_3$CF$_2$O—CF$_2$CF$_2$O—CF$_2$CF$_2$O—, and the like, said perfluoroalkoxy group being acyclic or cyclic and having, for example, 1–28 carbon atoms and 1–7 ether oxygen atoms.

There will now be described various classes of polyfluoropolyether compositions of this invention. In these descriptions, formulas for backbone structures or chains are set forth, those backbone structures or chains (enclosed by braces) comprising various structural units, e.g., —CF$_2$O—, randomly distributed within the chain (rather than in the order depicted in the formulas for purposes of brevity).

A class of the polyfluoropolyether compositions of this invention comprises polyfluoropolyethers which have a backbone or linear chain structure comprising, or consisting essentially of, and represented by the formula

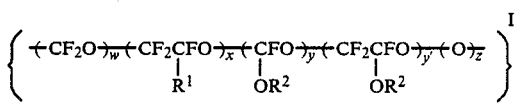

where each $R^1$ is independently a fluorine or a perfluoroalkyl group selected from linear groups, e.g., having 1 to 10 carbon atoms, branched groups, e.g., having 3 to 10 carbon atoms, and cyclic groups, e.g., having 3 to 6 carbon atoms, $R^1$ preferably being —F or —CF$_3$;

each OR$^2$ is independently a perfluoroalkoxy group wherein R$^2$ is a perfluoroalkyl group or a perfluoroalkyl group substituted with one or more ether oxygen atoms, which can be independently selected from units having the structure $+R^3O+_fR^4$, in which each R$^3$ is independently selected from —CF$_2$—, —CF$_2$CF$_2$— and

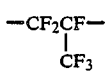

and R$^4$ is a perfluoroalkyl group selected from linear groups, e.g., having 1 to 10 carbon atoms, branched groups, e.g., having 3 to 10 carbon atoms, and cyclic groups, e.g., having 3 to 6 carbon atoms, and f is zero or a number having a value of 1 to 6, R$_4$ preferably being —CF$_3$, —C$_2$F$_5$, —C$_3$F$_7$, or —C$_4$F$_9$;

w is a number representing the average number of $+CF_2O+$ units randomly distributed within the chain and has a value of 1 or greater, e.g., up to about 10,000, w preferably being 1 to about 5000 when $R^1$ is —F and 1 to about 50 when $R^1$ is —CF$_3$;

x is a number representing the average number of

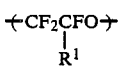

units randomly distributed within the chain and has a value of 1 or greater, e.g., up to about 10,000, x preferably being 1 to about 6000 when $R^1$ is —F and about 5 to 50 when $R^1$ is —CF$_3$;

y and y' are each a number representing the average number of

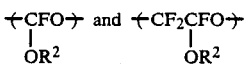

units, respectively, randomly distributed within the chain, the sum of y and y' having a value of 1 or greater, e.g., up to about 800, the sum preferably being 1 to about 600 when $R^1$ is —F and 1 to about 50 when $R^1$ is —CF$_3$, and the ratio y/y' being 0 to 5;

z is a number representing the average number of oxygen atoms, —O—, randomly distributed within the chain which when bonded to an —O— of the $+CF_2O+$,

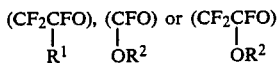

forms a peroxy group, —O—O—, and has a value of 0, in which case the polyfluoropolyethers are non-peroxidic, or greater, e.g., up to about 5000, preferably up to about 1500 when $R^1$ is —F and up to about 15 when $R^1$ is —$CF_3$;

the ratio w/x is 5 or less, the ratio preferably being about 0.5 to 5 when $R^1$ is —F and about 0.05 to 0.5 when $R^1$ is —$CF_3$;

the ratio (y+y')/(w+x) is 0.01 to 1.5, preferably 0.05 to 1.5, the ratio preferably being about 0.05 to 1 when $R^1$ is F, and about 0.1 to 1.0 when $R^1$ is $CF_3$;

the ratio z/(w+x+y+y') is 0 to 1, the ratio preferably being 0 to about 0.5 when $R^1$ is —F and 0 to about 0.1 when $R^1$ is —$CF_3$; and the number average molecular weight of the polyfluoropolyethers is preferably from about 650 to 1,000,000 or more.

A class of the polyfluoropolyether compositions of the invention comprise polyfluoropolyethers having the above-described polyether chain and can be represented by the formula

II

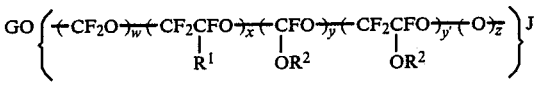

where
$R^1$, $R^2$, w, x, y, y' and z are as defined above,
when z is zero, G and J are independently selected from $C_jF_{2j}X$ in which X is hydrogen or halogen, e.g., —F or —Cl, and when X is hydrogen then j is 1 or 2, and when X is halogen then j is an integer of 1 to 5, or G and J are terminal functional groups which can enter into an addition or condensation reaction to form a homopolymer or copolymer, and
when z is 1 or greater, e.g., up to about 5000, or when z is zero, G is selected from —COF, —$CF_2COF$, —CFCOF, —$CF_2COCF_3$,
                        |
                       $CF_3$ —$CF_2C(OH)_2CF_3$, —CFCOOH, and —$CF_2COOH$
                     |
                    $CF_3$ and J is selected from —COF, —$CF_2COF$, —CFCOF, —$CF_2COCF_3$, —CFCOOH,
                  |                        |
                 $CF_3$                   $CF_3$ —$CF_2COOH$, —$CF_2C(OH)_2CF_3$, —$C_aF_{2a+1}$ and $C_aF_{2a}Cl$ where a is an integer of 1 to 5, and
the number average molecular weight of the polyfluoropolyethers can be in the range of from about 650 to 1,000,000 or more, preferably in the range of about 1000 to 1,000,000 when $R^1$ is —F and about 1000 to 6000 when $R^1$ is —$CF_3$.

A class of the peroxidic poly(perfluorooxyalkylene) compositions of this invention comprise peroxidic poly(perfluorooxyalkylenes) which is a subclass within the scope of formula II and can be represented by the formula

III

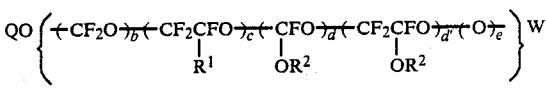

wherein
$R^1$ and $R^2$ are as described above;
Q is selected from —COF, —$CF_2COF$, —$CF_2COCF_3$, —$CF_2C(OH)_2CF_3$,

—CFCOF, —CFCOOH
  |         |
 $CF_3$    $CF_3$ and —$CF_2COOH$;
W is a terminal group selected from Q, $C_aF_{2a+1}$, and $C_aF_{2a}Cl$ where a is an integer up to 5;
b is a number representing the average number of —($CF_2O$)— units randomly distributed within the chain and has a value of 1 or greater, e.g., up to about 10,000, b preferably being 1 to about 5000 when $R^1$ is —F and 1 to about 50 when $R^1$ is —$CF_3$;
c is a number representing the average number of

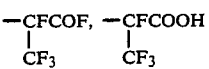

units randomly distributed within the chain and has a value of 1 or greater, e.g., up to about 10,000, c preferably being 1 to about 6000 when $R^1$ is —F and about 5 to 50 when $R^1$ is —$CF_3$;
d and d' are each a number representing the average number of

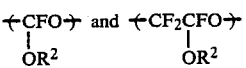

units, respectively, randomly distributed within the chain, the sum of d and d' has a value of 1 or greater, e.g., up to about 800, the sum preferably being 1 to about 600 when $R^1$ is —F and 1 to about 50 when $R^1$ is —$CF_3$, and the ratio d/d' is 0 to 5;
e is a number representing the average number of —(O)— units randomly distributed within the chain and has a value of 1 or greater, e.g., up to about 5000, e preferably being 1 to about 1500 when $R^1$ is —F and 1 to about 15 when $R^1$ is —$CF_3$;
the ratio b/c is less than 5, preferably 0.5 to 5 when $R^1$ is —F and less than 0.5 when $R^1$ is —$CF_3$;
the ratio (d+d')/(b+c) is 0.01 to 1.5, preferably 0.05 to 1.5, the ratio preferably being about 0.05 to 1 when $R^1$ is —F and about 0.1 to 1 when $R^1$ is —$CF_3$;
the ratio e/(b+c+d+d') is 0.0001 to 1, the ratio preferably being 0.001 to 0.5 when $R^1$ is —F and 0.03 to 0.1 when $R^1$ is —$CF_3$; and
the number average molecular weight of the poly(perfluorooxyalkylenes) can be from about 650 to 1,000,000 or more, preferably 1000 to 1,000,000 when $R^1$ is —F and 1000 to 6000 when $R^1$ is —$CF_3$.

The peroxidic poly(perfluorooxyalkylene) compositions are useful as crosslinking agents for elastomeric polymers, such as fluorinated polymers and copolymers, for example, copolymers of vinylidene fluoride and hexafluoropropylene, as initiators for free-radical polymerization, and as precursors for forming non-peroxidic polyfluoropolyethers of this invention.

A class of the non-peroxidic polyfluoropolyether compositions of this invention comprise non-peroxidic polyfluoropolyethers which is a subclass within the scope of formula II and can be represented by the formula

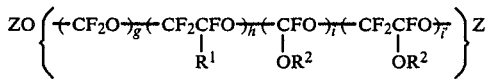
IV wherein
$R^1$ and $R^2$ are as defined for formula I;
each Z is independently a terminal group which is a functional, or polymerizable, group Y, which is or contains a functional moiety which can enter into an addition or condensation reaction to form a homopolymer or copolymer, or Z is a non-functional, or inert, group $C_jF_{2j}X$ in which X is hydrogen or halogen, e.g., —F or —Cl, and when X is hydrogen then j is 1 or 2, and when X is halogen then j is an integer of 1 to 5;
g is a number representing the average number of —(-CF$_2$O—)— units randomly distributed within the chain and has a value of 1 or greater, e.g., up to about 2000, g preferably being 1 to about 1000 when $R^1$ is —F and 1 to about 25 when $R^1$ is —CF$_3$;
h is a number representing the average number of

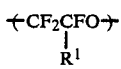

units randomly distributed within the chain and has a value of 1 or greater, e.g., up to about 2000, h preferably being 1 to about 1000 when $R^1$ is —F and about 5 to 50 when $R^1$ is —CF$_3$;
i and i' are each a number representing the average number of

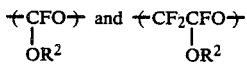

units, respectively, randomly distributed within the chain, the sum of i and i' has a value of 1 or greater, e.g., up to about 50, the sum preferably being 1 to about 30 when $R^1$ is —F and 1 to about 25 when $R^1$ is —CF$_3$, and the ratio i/i' is 0 to 5;
the ratio g/h is less than 5, preferably 0.5 to 5 when $R^1$ is —F and less than 0.5 when $R^1$ is —CF$_3$;
the ratio (i+i')/(g+h) is 0.01 to 1.5, preferably 0.05 to 1.5, the ratio preferably being 0.05 to 1 when $R^1$ is —F and 0.1 to 1 when $R^1$ is —CF$_3$; and
the number average molecular weight of the polyfluoropolyether can be about 650 to 20,000, preferably about 1000 to 10,000 when $R^1$ is —F and 1000 to 6000 when $R^1$ is —CF$_3$.

A preferred subclass of the non-peroxidic polyfluoropolyether compositions of the invention are inert liquids comprising polyfluoropolyethers represented by the formula

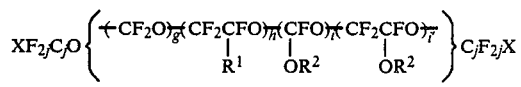
V where $R^1$, $R^2$, g, h, i, i', and —$C_jF_{2j}X$ are as defined for formula IV.

The inert liquids, which include products having boiling ranges from about 140° C. at one atmosphere to more than 350° C. at 0.1 torr and viscosities ranging from less than one centistoke to several thousand centistokes at room temperature, are useful in various applications. Lower boiling fractions can be used as solvents, dielectric media, hydraulic fluids, and heat transfer fluids. The higher boiling fractions and distillation residues can be used for lubricants, especially in applications requiring both low viscosity and inertness to harsh conditions, such as those found in semiconductor processing equipment.

A further preferred subclass of the non-peroxidic polyfluoropolyether compositions of the invention comprise mono- or di-functional polyfluoropolyethers represented by the formula

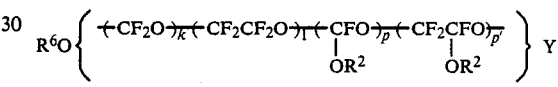
VI where
$R^2$ and Y are as defined above;
$R^6$ is preferably Y as defined for formula IV, but can be a perfluoroalkyl or haloperfluoroalkyl group having, e.g., 1 to 5 carbon atoms, and preferably selected from —CF$_3$, —CF$_2$CF$_3$, —CF$_2$Cl and —CF$_2$CF$_2$Cl;
k is a number representing the average number of —(-CF$_2$O—)— units randomly distributed within the chain and has a value of 1 to about 200;
l is a number representing the average number of —(-CF$_2$CF$_2$O—)— units randomly distributed within the chain and has a value of 1 to about 200;
p and p' are each a number representing the average number of

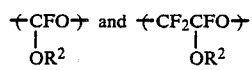

units, respectively, randomly distributed within the chain, the sum of p and p' has a value of 1 to about 50, and the ratio p/p' is 0 to 5;
the ratio k/l is less than 5;
the ratio (p+p')/(k+l) is 0.01 to 1.5, preferably 0.05 to 1; and
the number average molecular weight of the polyfluoropolyether can be from about 650 to 20,000, preferably about 1000 to 10,000.

Another preferred subclass of the non-peroxidic polyfluoropolyether compositions of the invention comprise functional polyfluoropolyethers represented by the average formula

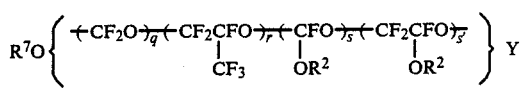

where
R² and Y are as defined above;
R⁷ is Y or a perfluoroalkyl or haloperfluoroalkyl group having, e.g., one to five carbon atoms, with R⁷ preferably being selected from —CF₃, —CF₂CF₃, and —CF₂CF(CF₃)₂;
q is a number representing the average number of ―(―CF₂O―)― units randomly distributed within the chain and has a value of 1 up to about 50, preferably 1 to 15;
r is a number representing the average number of

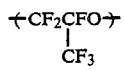

units randomly distributed within the chain and has a value of 5 up to about 50, preferably 5 to 30;
s and s' are each a number representing the average number of

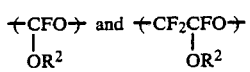

units, respectively, randomly distributed within the chain, the sum of s and s' has a value of 1 up to about 40, preferably 1 to 15, and the ratio s/s' is 0 to 5;
the ratio q/r is 0.01 to 1, preferably 0.05 to 0.5; the ratio (s+s')/(q+r) is 0.01 to 1, preferably 0.05 to 1, more preferably 0.05 to 0.5; and
the number average molecular weight of the polyfluoropolyether is from 650 to 10,000, preferably 1000 to 6000.

The functional group-terminated polyfluoropolyethers of formulas VI and VII are useful as lubricants, viscosity index additives for perhalogenated lubricants, hydraulic fluids, water and oil repellents, surface active agents, anti-corrosion agents, mold release agents, release agents for pressure-sensitive adhesives, flotation agents, plasticizers for fluorinated plastics, and prepolymers which can be polymerized to form molded articles, such as hoses and gaskets which are chemically resistant and flexible at low temperatures, and as a constituent of ophthalmic lenses. Particularly useful functional terminal groups include, for example, hydroxyl, ester, acrylate and methacrylate, and substituted silane.

The structures of the polyfluoropolyethers having pendant perfluoroalkoxy groups, —OR², of this invention can be determined by ¹⁹F nuclear magnetic resonance (NMR) analysis. The backbone unit ratios can be calculated from ratios of the integrated peak intensities of the NMR spectrum. The number average molecular weights can be calculated from end group analysis.

Although the compounds of formula IV, VI, and VII are shown as being monofunctional or difunctional, the actual products prepared are generally mixtures of monofunctional, difunctional, and inert compounds. Products called "monofunctional" herein generally contain less than 25 weight percent each of difunctional and inert compounds. Products called "difunctional" herein preferably contain less than 20 weight percent, more preferably less than 10 weight percent total monofunctional and inert compounds.

The compositions of the invention as prepared generally are mixtures of polyfluoropolyethers having ―(―CF₂O―)―,

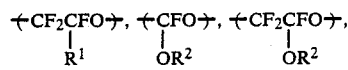

and, optionally, ―(―O―)― backbone units, but may contain small amounts, i.e., less than 10 mole percent, of other backbone units, such as —CF(CF₃)O—, ―(―CF₂)ₙO— where n is greater than 2, and —CF₂CF(CF₃)CF₂O—, the small amounts of these other units not affecting the general properties of the compositions of the invention. The compositions may also contain a small amount of molecules having no

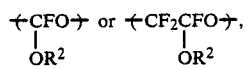

thus resulting in compositions where the average number of

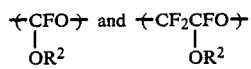

backbone units per molecule is less than one.

The invention also provides various processes for the preparation of polyfluoropolyether compositions. The process for preparing the compositions comprising the peroxidic carbonylfluoride-terminated polyfluoropolyether compositions comprises photooxidizing a mixture of perfluoroolefin and perfluoro(alkyl vinyl) ether by the steps of
(a) introducing into a reaction vessel, optionally containing an inert halocarbon solvent, reactants comprising
  (i) one or more perfluoroolefins,
  (ii) one or more perfluoro(alkyl vinyl) ethers, and
  (iii) oxygen,
(b) exposing the resulting reaction mixture to actinic radiation to form a peroxidic poly(perfluorooxyalkylene) composition comprising peroxidic poly(perfluorooxyalkylenes) represented by Formula III.

Generally, the reaction can be carried out at a temperature of from about −100° C. to 25° C. and at a pressure of 0.5 to 10 atmospheres. The preferred actinic radiation is ultraviolet radiation having a wavelength distribution between about 1800 and 3000 Å.

The peroxidic poly(perfluorooxyalkylene) reaction product can then be subjected to partial or complete deperoxidation, preferably by thermal and/or ultraviolet radiation treatment as described in U.S. Pat. Nos. 3,442,942 and 3,715,378 (Sianesi et al.), which patents are incorporated herein by reference for a description of said treatment. The resulting product is either a reduced peroxidic product such as that comprising compounds of Formula III or a product comprising completely deperoxided polyfluoropolyether such as that represented by the formula

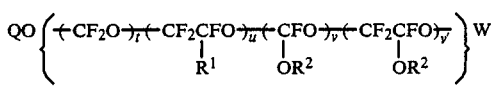

VIII wherein
Q and W are as defined above for formula III;
$R^1$, and $R^2$ are the same as defined above;
t and u are numbers independently having a value of 1 to about 1000; the ratio t/u is less than about 5; and
v and v' are each a number representing the average number of

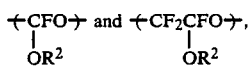

respectively, randomly distributed within the chain, the sum of v and v' has a value of 1 or greater, e.g., up to about 600, and the ratio v/v' is 0 to 5;
the ratio of (v+v')/(t+u) is 0.01 to 1.5, preferably 0.05 to 1.5; and
the number average molecular weight can be in the range of from about 650 to 1,000,000.

The functional group-terminated polyfluoropolyether compositions comprising the polyfluoropolyethers, such as represented by formulas VI and VII can be formed by reduction of the peroxidic composition comprising the peroxidic poly(perfluorooxyalkylenes) such as represented by Formula III, the reduction of the modified (reduced peroxide) polyfluoropolyether composition comprising the polyfluoropolyether such as represented by Formula III, or the reduction of the deperoxidized product of Formula VIII to form compositions comprising ester- or alcohol-terminated polyfluoropolyethers such as represented by Formula VI or VII using known chemical techniques.

To produce the polyfluoropolyether compositions comprising the polyfluoropolyethers represented by Formula VI, the preferred method is to react the reduced peroxidic composition comprising the poly(perfluorooxyalkylenes) represented by Formula III with hydriodic acid and methanol to form polyfluoropolyether compositions comprising difunctional methyl ester-terminated polyfluoropolyethers represented by Formula VI. These ester end-groups can then be converted to other functional end-groups as disclosed in U.S. Pat. Nos. 3,810,874, 4,085,137, and 4,094,911 (Mitsch et al.), which patents are incorporated herein by reference for a description of said conversion.

To produce the compositions comprising the polyfluoropolyethers represented by Formula VII, the preferred method is to completely deperoxidize the peroxidic composition comprising the poly(perfluorooxyalkylenes) represented by Formula III to form the nonperoxidic composition comprising the polyfluoropolyether represented by Formula VIII. This latter composition is then treated with a reducing agent such as sodium borohydride to form an alcohol. The alcohol can then be derivatized by procedures described in U.S. Pat. No. 4,094,911 to yield various derivatives.

The polyfluoropolyether compositions comprising the polyfluoropolyethers represented by Formula V are preferably prepared by subjecting the peroxidic composition comprising the poly(perfluorooxyalkylenes) represented by Formula III or the deperoxidized composition comprising the polyfluoropolyether represented by Formula VIII, to either a thermal treatment in the presence of elemental fluorine, a thermal treatment in the presence of an alkali metal hydroxide, or a thermal treatment in the presence of an alkali metal hydroxide followed by chlorination or fluorination. When the thermal treatment in the presence of an alkali metal hydroxide is used alone an inert fluid of Formula V is obtained in which X is hydrogen and, when this thermal treatment is followed by chlorination or fluorination, an inert fluid of Formula V is obtained in which X is chlorine and fluorine, or fluorine only, respectively.

Examples of perfluoroolefins that, either alone or in admixture with one another, can be used as reactants in the process of the invention include any perfluoroolefin having α, β-ethylenic unsaturation, such as tetrafluoroethylene, hexafluoropropylene, octafluorobutene-1, decafluoropentene-1, and perfluoroheptene-1. Generally, any of the perfluoroolefins having 2 to about 12 carbon atoms and which are linear or branched, and which can contain cyclic substituents having 3 to 6 carbon atoms can be used. Preferably, the reactant is tetrafluoroethylene and/or hexafluoropropylene.

The perfluoro(alkyl vinyl) ether used to make the compositions of the invention can be represented by the general formula $F_2C=CFOR^2$ wherein $R^2$ is as defined for Formula I. Examples of useful perfluoro(alkyl vinyl) ethers include the following:

$F_2C=CFOCF_2CF_2CF_3$

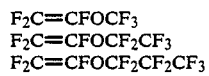

$F_2C=CFOCF_2CF_2CF_2CF_3$

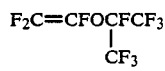

$F_2C=CFOCF_2CF_2CF_2CF_2CF_3$

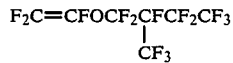

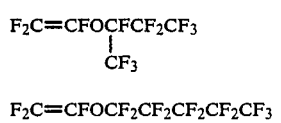

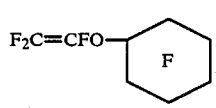

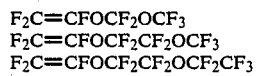

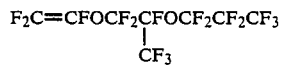

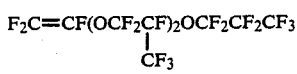

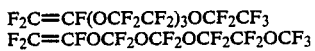

The perfluoro(alkyl vinyl) ethers are well known and are prepared by reactions known in the art. (See, for example, U.S. Pat. No. 3,114,778.)

In the first step of the photooxidation process of the invention, a mixture of perfluoroolefin(s) and perfluoro(alkyl vinyl) ether(s) is photooxidized in a batchwise or continuous process. In the batchwise process, the reactor can be equipped with a cooling jacket, a quartz immersion well containing a source of actinic radiation, preferably ultraviolet radiation, such as is emitted by a mercury vapor lamp, a thermocouple, means for introducing a gas below the surface of a liquid contained in the reactor, and a reflux condenser that is cooled to and maintained at a temperature, for example, of from about −100° C. to about 25° C., preferably between about −75° C. and −25° C. A mixture of the perfluorinated reactants, for example, one part by weight of one or more perfluoroolefins and 0.01 to 100 parts by weight, preferably 0.1 to 0.5 parts by weight, of one or more perfluoro(alkyl vinyl) ethers and optionally up to about 100 parts by weight of one or more solvents, preferably a halocarbon solvent such as dichlorodifluoromethane, hexafluoroethane, or trichlorotrifluoroethane, can be introduced into the reactor either all at the beginning of the reaction or one or more of the perfluoroolefins and perfluoro(alkyl vinyl) ethers are added continuously during the course of the reaction period. Ultraviolet radiation is activated and a flow of a molecular oxygen-containing gas, e.g., oxygen, oxygen diluted with an inert gas such as nitrogen or argon, or air is initiated and continued at a rate sufficient to maintain a steady state saturation of the mixture with oxygen. When tetrafluoroethylene is the olefin being used in the reaction, it is preferable that it be added continuously, and that the molar ratio of oxygen flow to tetrafluoroethylene flow be greater than about 2.0 to avoid formation of poly(tetrafluoroethylene). Perfluoroolefins, perfluoro(alkyl vinyl) ethers, and solvents that are entrained in effluent gases are returned to the reactor by the reflux condenser. The reaction mixture is kept at a desired temperature, for example, between about −100° C. and 25° C., preferably between −50° C. and −30° C., and pressure maintained, for example, at about 0.5 to 10 atmospheres, preferably about 1 atmosphere. The reaction is allowed to proceed for a time from less than one hour to 24 hours or longer. At the end of the reaction period, volatile materials are removed to recover the reaction product as a fluid containing the peroxidic poly(perfluorooxyalkylenes) represented by Formula III. Generally, the lower the reaction temperature, the higher the number average molecular weight of the product as determined by $^{19}F$ nuclear magnetic resonance (NMR) spectroscopy.

In the continuous process, the reactor can be equipped as in the batchwise process. The continuous process also has a means of continuously withdrawing a portion of the reaction mixture and subjecting it to distillation. The reactor is maintained, for example, at a temperature from about −100° C. to about 25° C., preferably from about −75° C. to about −25° C., and at a pressure, for example, between about 0.5 to 10.0 atmospheres, preferably at atmospheric pressure.

The continuous process is started as in the batchwise process. A portion of the perfluoroolefins, perfluoro(alkyl vinyl) ethers, and optional solvents may be charged into the reactor at the beginning as in the batchwise process, with the remainder being added continuously over the course of the reaction period. Either immediately upon starting, or up to 10 hours later, a portion of the reaction mixture is continuously withdrawn from the reactor. This mixture is distilled, the nonvolatile product containing the peroxidic poly(perfluorooxyalkylenes) of Formula III is collected, and the volatile components, i.e., unreacted monomers and optional solvents, can be returned to the reactor. Additional amounts of monomers and solvents can be added continuously as the reaction proceeds in order to replace materials lost by reaction or which escape through the reflux condenser. The rates of makeup feed and product takeoff are such that the residence time of perfluoroolefins in the presence of ultraviolet radiation is between about 15 minutes and 8 hours.

The photooxidation composition comprising the poly(perfluorooxyalkylenes) represented by Formula III may be subjected to partial or complete deperoxidation, for example by thermal and/or ultraviolet radiation treatment. This results in either a modified product with reduced peroxide content which can still be described as a composition comprising poly(perfluorooxyalkylenes) represented by Formula III, or a completely deperoxidized composition comprising the polyfluoropolyether represented by Formula VIII. When using thermal treatment to modify the peroxidic composition comprising the poly(perfluorooxyalkylenes) represented by Formula III, it is necessary to heat the material in the exclusion of oxygen at a rate of less than 1° C. per minute, preferably less than 0.5° C. per minute. The temperature of the material is held at, for example, from 150° to 200° C. for a length of time from one hour up to 60 hours or longer. Because of the danger of explosion, it is desirable that the heating take place in a safety bunker.

The peroxide content of the photooxidation products can also be reduced by exposure to ultraviolet radiation in the absence of oxygen. The reaction can be carried out neat or in solution, for example, in up to about twenty parts by weight of an inert solvent per part of photooxidation product, preferably one to 15 parts by weight, and at a temperature, for example, of from zero to 50° C., preferably 25° to 35° C. Ultraviolet radiation having a wavelength from about 1800 to 3000 Å can be used. The resulting products comprise either modified polyperoxides having reduced peroxide content as represented by Formula III, or comprise completely deperoxidized materials represented by Formula VIII.

Compositions comprising functional group-terminated polyfluoropolyethers represented by Formulas VI and VII can be formed by reduction of the photooxidation product comprising the peroxidic poly(perfluorooxyalkylenes) represented by Formula III, the modified peroxidic composition comprising the peroxidic poly(perfluorooxyalkylenes) represented by Formula III, or the deperoxidized compositions comprising the polyfluoropolyethers represented by Formula VIII to form polyfluoropolyether compositions comprising the ester- or alcohol-terminated polyfluoropolyethers represented by Formula VI or VII. The ester and alcohol end groups can be converted into other end groups represented in Formulas VI and VII using classical techniques well-known to those skilled in the art.

The polyfluoropolyether compositions comprising polyfluoropolyethers represented by Formula VI are preferably prepared by reacting modified (reduced peroxide) compositions comprising poly(perfluorooxyalkylenes) represented by Formula III with hydriodic acid and methanol to form primarily difunctional methyl ester-terminated polyfluoropolyethers. This reaction is preferably carried out in a solvent such as Freon TM 113, refluxing the mixture for 10 to 15 hours. The solution is washed first with sulfur dioxide saturated water to remove iodine, then with deionized water. The solvent is removed by distillation. The difunctional esters can then be converted to various functional group-terminated polyfluoropolyethers using classical methods such as taught in U.S. Pat. Nos. 3,810,874 and 4,094,911.

The polyfluoropolyether compositions comprising the polyfluoropolyethers represented by Formula VII are preferable prepared by reacting the composition comprising deperoxidized polyfluoropolyether represented by Formula VIII with sodium borohydride and zinc chloride to form primarily monofunctional hydroxy-terminated products. The hydroxy-terminated material can then be converted to various functional group-teminated polyfluoropolyethers using methods such as those taught in U.S. Pat. Nos. 3,810,874 and 4,094,911.

Preferably, Y in Formulas IV, VI, and VII has its functional moiety attached to the poly(perfluorooxyalkylene) backbone or chain via a connecting divalent group such as $$-CF_2C(=O)-, \quad -CF_2CH_2-, \quad -CF_2CH(CF_3)-, \quad \text{or} \quad -CFCH_2(CF_3)-.$$

Examples of the functional moieties include —OH, —SH, —NHR$^9$, —COOR$^8$, —SiR$^8_a$R$^{10}_{3-a}$, —CN, —NCO,

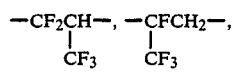

$$-OCH_2C(R^{11})\overset{O}{\underset{}{\diagup\diagdown}}CH(R^{12}), \quad -OSO_2CF_3, \quad -OCOCl, \quad -OCN,$$

$$-N(R^8)CN, \quad -\overset{O}{\underset{}{C}}O\overset{O}{\underset{}{C}}R^8,$$

—N=C, —I, —CHO, —CH(OCH$_3$)$_2$, —SO$_2$Cl, —C(OCH$_3$)=NH, —C(NH$_2$)=NH, and the like, wherein R$^8$ is lower alkyl C$_1$-C$_8$ or phenyl, R$^9$ is hydrogen or R$^8$, R$^{10}$ is a hydrolyzable group such as halogen, an alkoxy or an acyloxy group having 1 to 6 carbon atoms, a is an integer of 1 to 3, R$^{11}$ and R$^{12}$ are independently hydrogen or lower alkyl of 1 to 4 carbon atoms or R$^{11}$ and R$^{12}$ together are alkylene and with carbons to which they are attached form a carbocyclic ring of 5 or 6 carbon atoms.

Preferred connecting groups in Y for the polyfluoropolyethers represented by Formula VI includes —CF$_2$CH$_2$— and for the polyfluoropolyethers represented by Formula VII includes $$-CF_2CH(CF_3)-, \quad -CFCH_2(CF_3)-,$$

and —CF$_2$CH$_2$— which connect functional moieties preferably selected from α,β-ethylenically-unsaturated alkyl, 1,2-epoxy, isocyanato, and hydrolyzable silyl-terminated groups. Examples of such functional moieties are:

$$-O\overset{O}{\underset{}{C}}C(CH_3)=CH_2, \quad -NH\overset{O}{\underset{}{C}}C(CH_3)=CH_2, \quad -O\overset{O}{\underset{}{C}}CH=CH_2, \quad -OCH=CH_2,$$

—OCH$_2$CH=CH$_2$, —NHCH$_2$CH=CH$_2$, —N(CH$_2$CH=CH$_2$)$_2$,

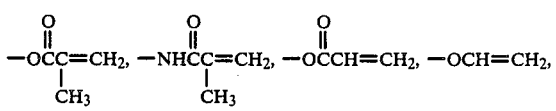

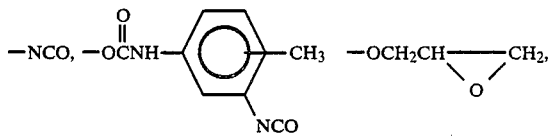

—OCH$_2$CH(OH)CH$_2$O(CH$_2$)$_3$Si(OCH$_3$)$_3$,

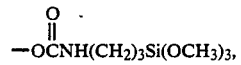

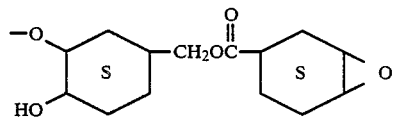

An additional preferred connecting group for the polyfluoropolyethers represented by Formula VI is $$-CF_2\overset{O}{\underset{}{C}}-,$$

which connects functional groups preferably selected from α,β-ethylenically-unsaturated alkyl, 1,2-epoxy, hydroxy, and hydrolyzable silyl groups, such as —OCH=CH$_2$,

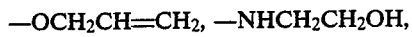

—OCH₂CH=CH₂, —NHCH₂CH₂OH,

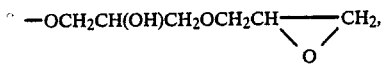

—N(CH₂CH₂OH)₂, —NHCH₂CH=CH₂,
—NH(CH₂)₃Si(OCH₃)₃, —N(CH₂CH=CH₂)₂,
—OCH₂CH(OH)CH₂O(CH₂)₃Si(OCH₃)₃.

Compositions comprising the compounds represented by Formulas IV, VI, and VII can be prepared by either of the following two processes.

(1) Where the connecting group in Y of Formula VI is

the compounds are prepared from carbonyl fluoride-terminated perfluoropolyethers, or the corresponding carboxylic acids or esters, by reaction with a hydroxy or a primary or secondary amino reactant also having a functional moiety that can enter into an addition or condensation reaction to form a polymer. Examples of such reactants are

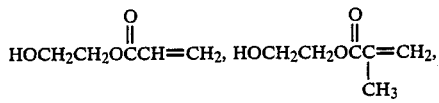

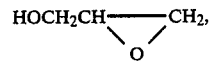

HOCH₂CH=CH₂, HN(CH₂CH=CH₂)₂,
H₂N(CH₂)₃Si(OCH₃)₃, HOCH₂CH₂NHCH₂CH₂OH,
HOCH₂CH₂NH₂.

(2) Where the connecting group in Y of formula VI is —CF₂CH₂— and in Formula VII is —CF₂CH₂—,

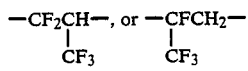

the compounds are prepared by first reducing the terminal carbonyl fluoride groups to the hydroxy-terminated polyfluoropolyether represented by the formula

IX

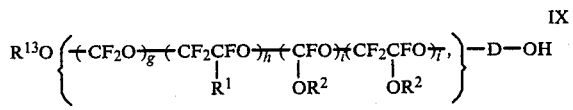

wherein g, h, i, i', R¹, and R² are as defined for Formula IV, D is a connecting group selected from —CF₂CH₂—,

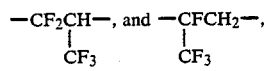

and R¹³ is selected from —CF₂CH₂OH,

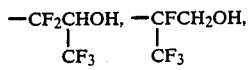

—CF₃, —CF₂CF₃, —CF₂CF(CF₃)₂, —CF₂Cl, and —CF₂CF₂Cl.

The hydroxy-terminated polyfluoropolyether of Formula IX is then converted to other functional terminal products by reaction with a polyfunctional reactant that has a functional moiety reactive with an alcohol to form a covalent bond between the reactant and the oxygen of the alcohol and has another functional moiety that can enter into a condensation or addition reaction to form a polymer. Examples of such reactants are

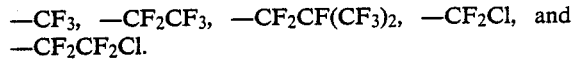

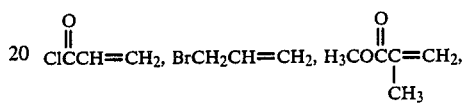

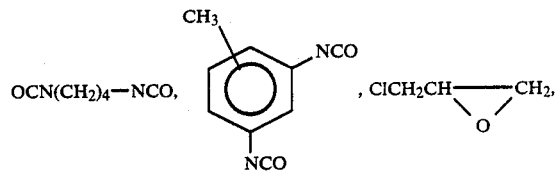

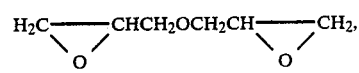

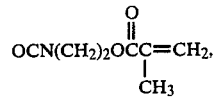

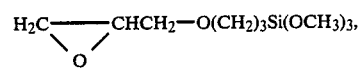

OCN(CH₂)₃—Si(OCH₃)₃,

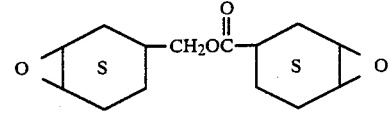

Illustrative of the functional group-terminated polyfluoropolyether compositions of the invention are those represented by the formula

X

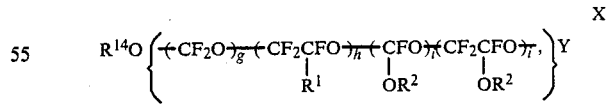

where R¹ and R² are as defined for formula I; Y, g, h, i, and i are as defined for Formula IV; and R¹⁴ is Y or a perfluoroalkyl or haloperfluoroalkyl group having one to five carbon atoms.

Various functional terminal groups, Y, and the polyfunctional organic reactants which react with the hydroxyl-, ester-, acid fluoride-, or carboxylic acid-terminated polyfluoropolyether precursor material to form the products represented by Formula X are set forth in Table I.

TABLE I

| Y | REACTANT |
|---|---|
| $-CF_2CH_2O\overset{O}{\underset{\|}{C}}-CH=CH_2$ | $Cl\overset{O}{\underset{\|}{C}}-CH=CH_2$ |
| $-CF_2CH_2O\overset{O}{\underset{\|}{C}}-\underset{\underset{CH_3}{\|}}{C}=CH_2$ | $Cl\overset{O}{\underset{\|}{C}}-\underset{\underset{CH_3}{\|}}{C}=CH_2$ |
| $-\underset{\underset{CF_3}{\|}}{C}FCH_2O\overset{O}{\underset{\|}{C}}\underset{\underset{CH_3}{\|}}{C}=CH_2$ | $Cl\overset{O}{\underset{\|}{C}}\underset{\underset{CH_3}{\|}}{C}=CH_2$ |
| $-CF_2CH_2O\overset{O}{\underset{\|}{C}}NHCH_2CH_2O\overset{O}{\underset{\|}{C}}\underset{\underset{CH_3}{\|}}{C}=CH_2$ | $OCNCH_2CH_2O\overset{O}{\underset{\|}{C}}\underset{\underset{CH_3}{\|}}{C}=CH_2$ |
| $-CF_2CH(CF_3)O\overset{O}{\underset{\|}{C}}NHCH_2\!\!-\!\!\underset{\underset{NHCOCH_2CH_2O\overset{O}{\underset{\|}{C}}\underset{\underset{CH_3}{\|}}{C}=CH_2}{\|}}{\overset{CH_3\;\;CH_3\;CH_3}{\underset{}{S}}}$ | $OCNCH_2\!\!-\!\!\underset{\underset{NHCOCH_2CH_2O\overset{O}{\underset{\|}{C}}\underset{\underset{CH_3}{\|}}{C}=CH_2}{\|}}{\overset{CH_3\;CH_3\;CH_3}{\underset{}{S}}}$ |
| $-CF_2CH_2OCH_2N\underset{\underset{CH_2CH=CH_2}{\diagdown}}{\overset{CH_2CH=CH_2}{\diagup}}$ | $BrCH_2CH_2N\underset{\underset{CH_2CH=CH_2}{\diagdown}}{\overset{CH_2CH=CH_2}{\diagup}}$ |
| $-CF_2\underset{\underset{CF_3}{\|}}{C}HOCH=CH_2$ | $CH_3\overset{O}{\underset{\|}{C}}OCH=CH_2$ |
| $-CF_2CH_2O\overset{O}{\underset{\|}{C}}NH\!\!-\!\!\underset{\underset{NCO}{\|}}{\overset{CH_3}{\bigcirc}}$ | $OCN\!\!-\!\!\underset{\underset{NCO}{\|}}{\overset{CH_3}{\bigcirc}}$ |
| $-CF_2CH_2OCH_2CH\!\!-\!\!\underset{O}{\overset{}{\diagdown}}\!CH_2$ | $ClCH_2CH\!\!-\!\!\underset{O}{\overset{}{\diagdown}}\!CH_2$ |
| $-CF_2CH_2OCH_2\overset{OH}{\underset{\|}{C}}HCH_2OCH_2CH\!\!-\!\!\underset{O}{\overset{}{\diagdown}}\!CH_2$ | $H_2C\!\!-\!\!\underset{O}{\overset{}{\diagdown}}\!CHCH_2OCH_2CH\!\!-\!\!\underset{O}{\overset{}{\diagdown}}\!CH_2$ |
| $-CF_2CH_2O\!\!-\!\!\underset{}{\overset{OH}{\underset{S}{\bigcirc}}}\!\!\overset{O}{\underset{\|}{C}}O-CH_2\!\!-\!\!\underset{S}{\bigcirc}\!\!\diagup\!\!O$ | $O\diagdown\!\!\underset{S}{\bigcirc}\!\!\overset{O}{\underset{\|}{C}}O-CH_2\!\!-\!\!\underset{S}{\bigcirc}\!\!\diagup\!\!O$ |
| $-CF_2CH_2O\overset{O}{\underset{\|}{C}}NHCH_2CH_2CH_2Si(OCH_3)_3$ | $OCNCH_2CH_2CH_2Si(OCH_3)_3$ |
| $-CF_2CH_2OCH_2\overset{OH}{\underset{\|}{C}}HCH_2OCH_2CH_2CH_2Si(OCH_3)_3$ | $H_2C\!\!-\!\!\underset{O}{\overset{}{\diagdown}}\!CHCH_2OCH_2CH_2CH_2Si(OCH_3)_3$ |
| $-CF_2CH_2OCH_2CH=CH_2$ | $\bigcirc\!\!-\!\!SO_2OCH_2CH=CH_2$ |

TABLE I-continued

| Y | REACTANT |
|---|---|
| −CF$_2$C(O)NHCH$_2$CH$_2$CH$_2$Si(OCH$_2$CH$_3$)$_3$ | H$_2$NCH$_2$CH$_2$CH$_2$Si(OCH$_2$CH$_3$)$_3$ |
| −CF$_2$C(O)NHCH$_2$CH=CH$_2$ | H$_2$NCH$_2$CH=CH$_2$ |
| −CF$_2$C(O)NHCH$_2$CH$_2$CH$_2$OH | H$_2$NCH$_2$CH$_2$CH$_2$OH |
| −CF$_2$C(O)OCH$_2$CH(OH)CH$_3$ | CH$_3$CH(−O−)CH$_2$ (propylene oxide) |
| −CF$_2$C(O)NH$_2$ | NH$_3$ |
| −CF$_2$C(O)NHCH$_2$CH$_2$NH$_2$ | H$_2$NCH$_2$CH$_2$NH$_2$ |
| −CF$_2$C(O)NHCH$_2$CH$_2$CH$_2$COOH | H$_2$NCH$_2$CH$_2$CH$_2$COOH |
| −CF$_2$C(O)N(CH$_2$CH$_2$OH)$_2$ | HN(CH$_2$CH$_2$OH)$_2$ |
| −CF$_2$C(O)OCH$_2$CH$_2$O−C(O)CH=CH$_2$ | HOCH$_2$CH$_2$OC(O)CH=CH$_2$ |
| −CF$_2$C(O)OCH$_2$CH(OH)CH$_2$OCH$_2$CH(−O−)CH$_2$ | CH$_2$(−O−)CHCH$_2$OCH$_2$CH(−O−)CH$_2$ |
| −CF$_2$C(O)N(CH$_2$CH=CH$_2$)$_2$ | HN(CH$_2$CH=CH$_2$)$_2$ |
| −CF$_2$CONHCH$_2$CH=CH$_2$ | H$_2$NCH$_2$CH=CH$_2$ |
| −CF$_2$CON(CH$_3$)CH$_2$CH$_2$OH | HN(CH$_3$)CH$_2$CH$_2$OH |
| −CF$_2$CONHCH$_2$CH$_2$SH | H$_2$NCH$_2$CH$_2$SH |
| −CF$_2$CONH(CH$_2$)$_3$Si(OCH$_3$)$_3$ | H$_2$N(CH$_2$)$_3$Si(OCH$_3$)$_3$ |
| −CF$_2$CONH−C$_6$H$_4$−OH (meta) | H$_2$N−C$_6$H$_4$−OH (meta) |
| −CF$_2$CONH−C$_6$H$_4$−CH$_2$CO$_2$H (para) | H$_2$N−C$_6$H$_4$−CH$_2$CO$_2$H (para) |
| −CF$_2$CONH−C$_6$H$_3$(OH)$_2$ | H$_2$N−C$_6$H$_3$(OH)$_2$ |
| CF$_2$CONH−C$_6$H$_4$−Si(CH$_3$)$_2$OC$_2$H$_5$ | H$_2$N−C$_6$H$_4$−Si(CH$_3$)$_2$OC$_2$H$_5$ |

TABLE I-continued

| Y | REACTANT |
|---|---|
| CF₂CONH—C₆H₄—CH=CH₂ | NH₂—C₆H₄—CH=CH₂ |
| CF₂CONH—C₆H₄—CH₂CH=CH₂ | H₂N—C₆H₄—CH₂CH=CH₂ |
| CF₂CONH—C₆H₃(NCO)(CH₃) | OCN—C₆H₃(NCO)(CH₃) |
| —CF₂CONH—C₆H₄—O—C₆H₄—NCO | OCN—C₆H₄—O—C₆H₄—NCO |
| —CF₂CONH—C₆H₄—CH₂—C₆H₄—NCO | OCN—C₆H₄—CH₂—C₆H₄—NCO |
| —CF₂-(5-hydroxybenzoxazol-2-yl) | (1) H₂N—C₆H₃(OH)₂ <br> (2) Heat |
| —CF₂-(5-(3,4-diaminophenyl)benzimidazol-2-yl) | (1) H₂N—C₆H₃(NH₂)—C₆H₃(NH₂)₂ <br> (2) Heat |
| —CF₂-(6-carboxybenzothiazol-2-yl) | (1) H₂N—C₆H₃(SH)(CO₂H) <br> (2) Heat |
| —CF₂C(=NN=C(CH₃)(C=CH₂))O (oxadiazole with isopropenyl) | (1) H₂NNHCOC(CH₃)=CH₂ <br> (2) Dehydration |
| —CF₂CO₂CH₂C(CH₃)₂CH₂OH <br> —CF₂CO₂CH₂CH=CH₂ <br> —CF₂CN | HOCH₂C(CH₃)₂CH₂OH <br> CH₂=CHCH₂OH <br> (1) NH₃ <br> (2) Dehydration |
| —CF₂-(triazine ring with CF₃ and CH=CH₂ substituents) | (1) NH₃ <br> (2) Dehydration <br> (3) H₂N—C(=NH)—CF₃ <br> (4) (CH₂=CHCO)₂O |

The functional group-terminated polyfluoropolyether compositions of this invention can be polymerized by well-known procedures to form a wide range of useful products. Generally, where the perfluoroolefin used to produce the polyfluoropolyether composition of this invention is tetrafluoroethylene, $CF_2=CF_2$, the polyfluoropolyether composition (Formula VI) is comprised of predominately, e.g., at least 80 weight percent, difunctional product and, when polymerized, becomes an integral part of the polymer chain. Generally, where the perfluoroolefin used to produce the polyfluoropolyether composition of this invention is hexafluoropropylene, $CF_3CF=CF_2$, the polyfluoropolyether composition (Formula VII) is comprised of predominately, e.g., at least 50 weight percent, monofunctional product and, when polymerized, forms a pendant group on the polymer chain.

These functional group-terminated polyfluoropolyethers can be polymerized to form polymers useful for the preparation of low surface energy liners for aggressive adhesives (using, e.g., the procedures described in U.S. Pat. Nos. 4,472,480 and 4,567,073) molded articles such as chemically resistant and low temperature flexible hoses and gaskets and solid rocket propellant binder (using, e.g., the procedures described in U.S. Pat. No. 3,972,856), abrasion resistant oil and water repellent surface coatings for cookware (using, e.g., the procedures described in U.S. Pat. No. 3,950,588), ophthalmic devices such as contact lenses, intraocular lenses, corneal lenses and implants and the like, and in hydrated blends such as, for example, use as water barriers, sealants, water sorbents, electrophoresis gels, coatings for prosthetic devices, membrane films, vascular prosthetic devices, cartilage replacements, and coextruded hydrophilic composites (e.g., catheters) (using, e.g., the procedures described in European Patent Application No. 84305837.1). In addition to their utility as prepolymers for the preparation of polymers, these functional group-terminated polyfluoropolyether compositions are also useful as lubricants, viscosity index additives for perhalogenated lubricants, hydraulic fluids (using, e.g., the procedures described in U.S. Pat. No. 3,845,051), water and oil repellents, surface active agents and anti-corrosion agents, antistick or release agents for molds, flotation agents, and plasticizers for fluorinated plastics. In the procedures of U.S. Pat. Nos. 4,472,480, 4,567,073, 3,972,856, 3,950,588, and 3,845,051 and European Patent Application No. 84305837.1, the polyethers described therein are substituted by the appropriate functional or non-functional polyfluoropolyether of the present invention.

Polymerization of the functional polyfluoropolyether compositions of the invention can be carried out using procedures well-known to those skilled in the art. For example, when the functional end group is acrylate or methacrylate, the polymerization of the polyfluoropolyether may be carried out by employing initiators which generate free-radicals on application of an activating energy as is conventionally used in the polymerization of ethylenically unsaturated monomers. Included among free-radical initiators are the conventional thermally activated initiators such as organic peroxides and organic hydroperoxides.

Photoinitiators may also be employed to initiate polymerization. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated, for example, by exposure to ultraviolet or electron beam irradiation.

Polymerization may also be carried out in bulk in a conventional manner. When the activating energy is ultraviolet light, the irradiation is typically carried out at a temperature of about 0° to 50° C. for 0.5 minute to 5 hours or more. Following ultraviolet irradiation, the composition may be heated at 50° to 100° C. to complete the polymerization.

When the activating energy is only heat, polymerization is usually carried out at a temperature from about 40° to 140° C. for about 5 to 50 hours. The polymerization can also be carried out in stages. Thus, in a first stage, the composition may be heated at 40° to 60° C. for about 5 to 25 hours, and in a second stage it may be heated at 50° to 100° C. for 5 to 25 hours. It is to be understood, of course, that the polymerization conditions are not limited to such temperature and time conditions nor to the use of ultraviolet or heat as the initiating energy.

When shaped or molded articles such as gaskets or ophthalmic devices are prepared using the functional polyfluoropolyether compositions of the invention, a mold of the desired configuration is charged with a material comprising the functional polyfluoropolyether composition and any other desired comonomer and the charge is polymerized by, for example, one of the techniques previously described. Articles having the desired final configuration may be obtained in this manner. The resultant article may be machined and/or polished if desired using techniques known to the art.

Alternatively, the devices of the invention may be provided by polymerizing the polyfluoropolyether into a rod, block, or sheet followed by cutting the article therefrom.

When a functional polyfluoropolyether composition is used as a release coating, for example, for pressure-sensitive adhesive tape, a solution of the polyfluoropolyether composition, preferably a composition having acrylate or methacrylate functionality, is coated on the substrate, for example, a flexible film. The coating is then dried and the polyfluoropolyether composition is polymerized to form a cohesive network adhered to the substrate. An adhesive layer such as a poly(dimethylsiloxane) can then be releasably adhered to the polymerized polyfluoropolyether composition.

When the functional polyfluoropolyether composition has epoxy functionality, materials comprised thereof can be cured by a variety of curing agents as are described, together with the method for calculating the amount to be used, in the book by Lee and Neville, "Epoxy Resins," pages 36 to 140, McGraw-Hill Book Company, New York, 1957. Useful curing agents include initiators such as amines and organic acids. The epoxy-functional polyfluoropolyether compositions can also be cured by catalytic agents that are either thermally-activated or photoactivated, e.g., Lewis acids, hindered Lewis acids, and onium salts.

The inert liquid compositions comprising polyfluoropolyethers represented by Formula V can be formed by subjecting either the composition comprising the peroxide poly(perfluorooxyalkylenes) represented by Formula III or the composition comprising the deperoxidized polyfluoropolyether represented by Formula VIII to a thermal treatment in the presence of an alkali metal hydroxide to yield a hydride-terminated polyfluoropolyether fluid. The hydride-terminated material can then be chlorinated to produce a chlorine-terminated product. Alternatively, compositions comprising the poly(perfluorooxyalkylenes) represented by Formula III or compositions comprising the polyfluoropolyethers represented by Formula VIII may be fluorinated to produce a perfluorinated inert liquid.

By thermal treatment in the presence of an alkali metal hydroxide, preferably sodium, potassium, or lithium hydroxide, or by treatment with fluorine, the carbonyl and carboxylic acid groups that are formed by hydrolysis of the carbonyl fluoride groups (hydrolysis can take place even in humid air) can be eliminated from the non-peroxidic compositions comprising the polyfluoropolyethers represented by Formula VIII and both the peroxide groups and the carbonyl fluoride and carboxylic acid groups can be eliminated from the peroxidic compositions comprising poly(perfluorooxyalkylenes) represented by Formula III. When the carbonyl groups are eliminated by thermal treatment in the presence of an alkali metal hydroxide, there is used, for example, about 10 to 20% by weight of alkali metal hydroxide based on the weight of the products comprising the poly(perfluorooxyalkylenes) represented by Formula III or the polyfluoropolyethers represented by Formula VIII. Reaction time is generally from about three to ten hours at temperatures which are gradually raised, for example, from about 50° C. to about 200° C. to 350° C., preferably about 250° C. There are obtained compositions comprising inert polyfluoropolyethers represented by Formula V in which X is hydrogen, the terminal groups —$CF_2H$ and —$CHFCF_3$ having been formed. The hydrogens can be replaced by halogens including fluorine and chlorine, by processes well-known to those skilled in the art.

When the compositions comprising poly(perfluorooxyalkylenes) represented by Formula III or compositions comprising polyfluoropolyethers represented by Formula VIII are thermally treated in the presence of fluorine, the terminal carbonyl and carboxylic acid groups are eliminated and terminal —$C_jF_{2j+1}$ groups, such as —$CF_3$, —$CF_2CF_3$, and —$C_4F_9$, are formed. This reaction is performed by heating the compositions comprising the poly(perfluorooxyalkylenes) represented by Formula III or the polyfluoropolyethers represented by Formula VIII to a temperature, for example, between about 50° C. and 300° C. and simultaneously introducing fluorine either neat or diluted with up to, for example, about ten parts by weight of an inert gas, e.g., nitrogen or argon. By-products of the reaction are carbon dioxide, carbonyl fluoride, trifluoroacetyl fluoride, and other low-molecular weight volatile compounds. Hydrogen fluoride is also obtained as a by-product when the treated material contains carboxylic acid groups.

The compositions comprising inert polyfluoropolyether liquids represented by Formula V can be separated by distillation into fractions having boiling ranges from, for example, about 50° C. to more than 350° C. at 0.1 torr and viscosities ranging from less than one centistoke to several thousand centistokes at room temperature. The inert liquids of the present invention have various applications. The lower boiling fractions can be used as solvents, dielectric media, hydraulic fluids, and heat transfer fluids and the higher boiling fractions and still residues can be used as lubricants, especially in applications requiring both low viscosity and inertness to harsh conditions such as those found in semiconductor processing equipment.

The polyfluoropolyether liquids of this invention have several advantages over the prior art. For instance, in addition to having new units in the backbone, viz., the perfluoromethyleneoxy and perfluoroethyleneoxy units with pendant perfluoroalkoxy groups, the fluids prepared from photooxidation of hexafluoropropylene/perfluoro(alkyl vinyl) ether mixtures show larger b/c ratios (Formula III) than those prepared under identical conditions from photooxidation of hexafluoropropylene alone. As shown in Example 2 below, these changes in backbone structure can lead to improved fluid properties. Also, as shown in Examples 33 and 34 below, cured coatings of polymerized functional group-terminated compositions of this invention perform as release coatings, e.g., for silicone pressure-sensitive adhesives, more effectively than materials prepared from hexafluoropropylene alone. Further, the polymerized functional polyfluoropolyether compositions have low glass transition temperatures (Tg) which provide excellent low temperature flexibility to shaped articles formed therefrom. Functional polyfluoropolyether compositions comprising compounds of Formula VI generally have a Tg less than about −100° C. with some species having a Tg of less than −120° C. Functional polyfluoropolyether compositions comprising compounds of Formula VII generally have a Tg less than about −78° C.

Although the b/c ratios in compositions prepared from photooxidation of hexafluoropropylene alone can be increased by raising the reaction temperature, this approach has some disadvantages. Temperatures above −30° C., the boiling point of hexafluoropropylene, require that the photooxidation reaction be run at pressures above 1 atmosphere (if no solvent is used), which involves construction of special equipment. Also, as the reaction temperature is raised, the molecular weight of the polymeric photoproduct decreases, while the fraction of starting material converted to non-recyclable oxidation products, such as hexafluoropropylene oxide, increases. Thus, addition of perfluoro(alkyl vinyl) ether to hexafluoropropylene photooxidation provides a means of varying the relative content of —$CF_2O$— backbone groups in the polymer without substantially altering other reaction conditions.

Objects and advantages of this invention are further illustrated by the following examples, but the particular materials and amounts thereof recited in these examples, as well as other conditions and details, should not be construed to unduly limit this invention.

In these examples, the structures of the poly(perfluoroalkylenes) and the polyfluoropolyethers are determined by $^{19}F$ and proton NMR analysis. The backbone unit ratios are calculated from ratios of the integrated peak intensities of the $^{19}F$ NMR spectrum. The number average molecular weights are determined by end group analysis.

EXAMPLE 1

A mixture of perfluoro(methyl vinyl) ether (35 g) and hexafluoropropylene (190 g) was condensed in a jacketed 250 ml Ace/Hanovia tubular glass photoreactor equipped with quartz immersion well, gas sparge tube, thermocouple, and an outlet leading to a reflux condenser maintained at −65° C. Cooled fluorocarbon Fluorinert ®FC-72 (product of 3M Company) was circulated as a heat exchange fluid through the reactor jacket and cooled nitrogen was blown through the quartz well to provide additional cooling and temperature control. Oxygen was bubbled into the solution at a rate of 13 l/hr. This mixture was irradiated with a Hanovia 100 watt medium-pressure mercury lamp with the reaction temperature regulated at −45° C. The reflux condenser returned entrained starting materials to the reactor. Gases exiting the condenser were scrubbed with aqueous potassium hydroxide before venting. After 6 hours, the lamp was switched off and the reactor allowed to warm to room temperature overnight under oxygen. Remaining in the reactor were 90 g colorless liquid. This product had an acitve oxygen content of 0.5 weight percent by iodimetry, and exhibited a $^{19}$F NMR spectrum consistent with a peroxidic poly(perfluorooxyalkylene) product comprising material having the structure represented by formula III where Q was —COF, —CF$_2$COF, and —CF$_2$COOH, the relative proportions being 91 mol %, 9 mol %, and a trace, respectively, W was —CF$_3$, R$^1$ was —CF$_3$, and R$^2$ was —CF$_3$. In the product, b/c was 0.15, (d+d')/(b+c) was 0.14, e/(b+c+d+d') was 0.05, d/d' was 0.28, and the number average molecular weight was 2400. The presence of incorporated perfluoro(methyl vinyl) ether-derived units in the chain comes from observation of $^{19}$F NMR signals at 54.5 ppm and 56.5 ppm (upfield from CFCl$_3$) attributable to pendant —OCF$_3$ groups, and at 96–99 ppm attributable to the methine fluorine of the the

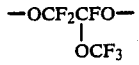

unit. The $^{19}$F NMR spectrum showed the absence of backbone units containing more than two catenary carbon atoms in the chain.

A 5.0 g sample of the above product was heated in a glass flask at 175° C. for 16 hr. After cooling, there remained 4.3 g liquid. Infrared spectroscopic analysis of this material revealed the presence of fluoroformate, acid fluoride, and carboxylic acid end groups. By $^{19}$F NMR, peroxide linkages were found to be absent, and the non-peroxidic product exhibited a structure consistent with that of a composition comprising the polyfluoropolyether represented by Formula VIII where W' was —CF$_3$ and (CF$_3$)$_2$CFCF$_2$—, the relative proportions being 93 mol % and 7 mol %, respectively, Q' was —COF, —CF$_2$COF, —CF(CF$_3$)COF, and —CO$_2$H, the relative proportions being 53 mol %, 7 mol %, 13 mol %, and 27 mol %, respectively, R$^1$ was —CF$_3$, and R$^2$ was —CF$_3$. In the product, t/u was 0.15, (v+v')/(t+u) was 0.10, v/v' was 0.30, and the number average molecular weight was 3000.

EXAMPLE 2

A jacketed, 250 ml tubular, stainless steel reactor was equipped with a quartz immersion well, gas sparge tube, two inlets for separate introduction of monomers, a reflux condenser maintained at −70° C., thermocouple, and temperature control equipment. Cooled Freon TM-11, CFCl$_3$, was circulated through the reactor jacket and condenser as a heat exchange fluid, and cooled N$_2$ was blown through the quartz immersion well. Hexafluoropropylene (253 g) was condensed into the reactor, and oxygen was bubbled through the liquid at a flow rate of 13 l/hr. Using a calibrated flow meter and metering valve, perfluoro(methyl vinyl) ether was added continuously to the reactor at a rate of 5.5 g/hr. This mixture was irradiated with a 100-watt Hanovia medium-pressure mercury lamp for 6 hr., with the reaction temperature maintained at −45° C. At the end of this period, the lamp and gas flows were stopped and the reactor was drained. Evaporation of volatiles left 115 g liquid product which was found to contain 0.8 g active oxygen by iodimetric titration. $^{19}$F NMR spectroscopy showed the peroxidic product to comprise material having a structure consistent with a composition comprising poly(perfluorooxyalkylenes) represented by Formula III where W was —CF$_3$, Q was —COF and —CF$_2$COF, the relative proportions being 92 mole % and 8 mol %, respectively, R$^1$ was —CF$_3$, and R$^2$ was —CF$_3$. In the product, b/c was 0.16, (d+d')/(b+c) was 0.13 and e/(b+c+d+d') was 0.08, d/d' was 0.22, and the number average molecular weight was 2500.

The above peroxidic product (102 g) was placed in a three-necked 250 ml flask equipped with mechanical stirrer, heating mantle, thermometer, and distilling head. While stirring, 13 g ground potassium hydroxide were added in portions. After addition was complete and foaming had subsided, the mixture was heated slowly to 140° C. and maintained at 140°-150° C. for 3 hours. The temperature was then taken to 250° C. and kept there for 30 minutes until gas evolution had subsided. Distilling from the reaction flask during this heating were 13 g water and low molecular weight fluorocarbon. After cooling, the flask residue was extracted with 100 ml Freon TM 113 and filtered. Evaporation of the solvent left 61 g clear, colorless liquid. The infrared spectrum of this liquid showed absence of carbonyl group absorption. By $^{19}$F and proton NMR, end groups of the types —OCF$_2$H and —OCFHCF$_3$ were detected. The product comprised material consistent with a composition comprising polyfluoropolyethers represented by Formula V where R$^1$ was —CF$_3$, R$^2$ was —CF$_3$, —C$_j$F$_{2j}$X was a mixture of —CF$_3$, —CF$_2$CF(CF$_3$)$_2$, —CF$_2$H, and —CFHCF$_3$, the relative proportions being 49 mol %, 5 mol %, 34 mol %, and 12 mol %, respectively. In the product, g/h was 0.19, (i+i')/(g+h) was 0.10 and i/i' was 0.27. The number average molecular weight was 3000. The material was fractioned in a CVC Lab-3 molecular still, and the distillation cut with a boiling range of 160°-250° C./0.01 torr was isolated. Viscosity of this cut was found to be 226 centistokes (cSt) at 20° C., compared to 270 cSt for an identical control cut prepared in a similar manner except for the omission of perfluoro(methyl vinyl) ether from the photooxidation reaction. The two fractions were shown by gel permeation chromatography to have virtually the same molecular weight and polydispersities, with the molecular weight of the control sample being slightly lower.

The above described fractionated hexafluoropropylene/perfluoro(methyl vinyl) ether copolyether cut (12.2 g) was heated at 250° C. under a stream of Cl$_2$ for 4 hours. The product (11.9 g) showed no absorption in the proton NMR spectrum. $^{19}$F NMR showed that the hydride-containing end groups had been replaced by —OCF$_2$Cl, —OCFClCF$_3$, and —OCF$_2$CFClCF$_3$. Other structural features were substantially unchanged.

EXAMPLE 3

Into the apparatus described in Example 2 were charged 252 g hexafluoropropylene. Flows of oxygen (13 l/hr) and perfluoro(-n-butyl vinyl) ether (6.5 g/hr., added via syringe pump) were started and the mixture was irradiated with a 100 watt Hanovia medium-pressure mercury lamp for 6 hours. Reaction temperature was kept at −45° C. Removal of volatiles left 118 g liquid product. The presence of incorporated perfluoro(butyl vinyl) ether-derived units is shown by observation of signals in the $^{19}$F NMR spectrum at 81 ppm (—OCF$_2$CF$_2$CF$_2$CF$_3$), 127 ppm (—OCF$_2$CF$_2$CF$_2$CF$_3$), and 96 ppm

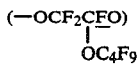

upfield from CFCl$_3$. No evidence of unreacted vinyl ether was found in the reaction mixture. The average structure of the peroxidic material corresponded to a composition comprising poly(perfluorooxyalkylenes) represented by Formula III where W was —CF$_3$, Q was —COF and —CF$_2$COF, the relative proportions being 91 mol % and 9 mol %, respectively, R$^1$ was —CF$_3$, and R$^2$ was —C$_4$F$_9$. In the product, b/c was 0.09, (d+d′)/(b+c) was 0.07, e/(b+c+d+d′) was 0.08, d/d′ was believed to be between about zero and 0.5 and the number average molecular weight was 2900.

EXAMPLE 4

A jacketed 2-liter stainless steel reactor fitted with a quartz immersion well, two fritted sparge tubes, a thermocouple, and a reflux condenser was cooled by circulating cooled Freon TM-11 fluid through the jacket and the condenser. The vessel was charged with 1700 ml of dichlorodifluoromethane that was cooled in the reactor to −40° C., which temperature was maintained during the course of the reaction. There were then introduced into the reactor through the sparge tubes 1.90 g/min tetrafluoroethylene that had been passed through a column of activated carbon to remove d-limonene inhibitor, 0.18 g/min perfluoro(propyl vinyl) ether, and 1.42 g/min oxygen. A Hanovia 200 watt medium-pressure mercury lamp, inserted in the immersion well, was then turned on. After two hours, the lamp and fluid flows were stopped, the reaction mixture removed and the CF$_2$Cl$_2$ allowed to evaporate. There remained 106 g of colorless liquid having by $^{19}$F NMR a peroxide content of 2.39 percent by weight and an average structure corresponding to a composition comprising poly(perfluorooxyalkylenes) represented by Formula III where Q was —CF$_2$COOH, and W was substantially the same as Q with some —CF$_2$Cl and —CF$_2$CF$_2$Cl also present, R$^1$ was fluorine, and R$^2$ was —C$_3$F$_7$. In the product, b/c was 0.74, (d+d′)/(b+c) was 0.0106, e/(b+c+d+d′) was 0.149, and d/d′ was 1.80 as indicated by signals upfield from CFCl$_3$ at 81.5 ppm (—OCF$_2$CF$_2$CF$_3$), 129.8 ppm (—CF$_2$CF$_2$CF$_3$), and 96.9 ppm and 98.4 ppm

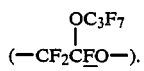

These latter peaks were obscured by peroxide peaks in the crude photooxidation product, but were detected in the material upon thermal deperoxidation. The relative distribution of end groups Q and W was 38 mol % —CF$_2$COOH, 34 mol % —CF$_2$Cl, and 28 mol % —CF$_2$CF$_2$Cl. The number average molecular weight was 40,000.

EXAMPLE 5

The procedure of Example 4 was repeated with the exception that 0.15 g/min of perfluoro(ethyl vinyl) ether was used in place of 0.18 g/min of perfluoro(propyl vinyl) ether. The reaction product had a number average molecular weight of 24,000. $^{19}$F NMR spectrometric data indicated that the peroxidic reaction product was consistent with a composition comprising poly(perfluorooxyalkylenes) represented by Formula III where R$^1$ was fluorine, R$^2$ was —C$_2$F$_5$, Q was —CF$_2$COOH, W was —CF$_2$COOH, with minor amounts of —CF$_2$Cl, —CF$_2$CF$_2$Cl, and —CF$_3$ also present. In the product, b/c was 0.74, (d+d′)/(b+c) was 0.0195, e/(b+c+d+d′) was 0.176, and d/d′ was 1.81. The relative distribution of end groups Q and W was 75 mol % —CF$_2$COOH, 14 mol % —CF$_2$Cl, 11 mol % —CF$_2$CF$_2$Cl, and a trace of —CF$_3$.

The above peroxidic reaction product was thermally treated to partially remove peroxide groups by heating to 155° C. over a period of 4 hours and holding at 155° C. for 125 hours. The product obtained was a composition comprising poly(perfluorooxyalkylenes) represented by Formula III where Q was —CF$_2$COOH, W was —CF$_2$COOH, —CF$_2$CF$_2$Cl, —CF$_3$, and —CF$_2$Cl. In the product, b/c was 1.19, (d+d′)/(b+c) was 0.0113, e/(b+c+d+d′) was 0.0117, d/d′ was 1.17, and the number average molecular weight was 16,000. The relative distribution of end groups Q and W was 68 mol % —CF$_2$COOH, 14 mol % —CF$_2$Cl, 10 mol % —CF$_2$CF$_2$Cl, and 8 mol % —CF$_3$.

EXAMPLE 6

Into the apparatus described in Example 2 were condensed 266 g hexafluoropropylene. An oxygen flow of 7 l/hr was started through the liquid, and the mixture irradiated for 6 hours at a temperature of −45° C., with a 100-watt Hanovia medium-pressure mercury lamp. During the first 5 hours, 79 g perfluoro(2-butoxypropyl vinyl) ether, n—C$_4$F$_9$OCF(CF$_3$)CF$_2$OCF=CF$_2$, bp 117°–125° C. (90% purity by gas chromatographic analysis), were added continuously via syringe pump at the rate of 15.8 g/hr. At the end of 6 hours, the lamp was shut off and the reactor was drained. Removal of 25° C. volatiles left 164 g liquid. Analysis of this product by $^{19}$F NMR showed no unreacted vinyl ether. A portion of the product (153 g) was heated in a glass 250 ml round-bottom flask to 250° C. over a period of 2 hr and then held at 250° C. for an additional 12 hr. Volatile material which distilled out during pyrolysis was collected in an amount of 43.7 g. This material was shown by $^{19}$F NMR spectrometry to be primarily a mixture of

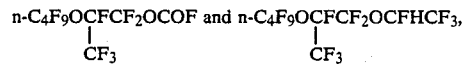

the latter present as an impurity in the starting material. No unreacted vinyl ether was recovered.

The pyrolysis residue amounted to 90 g. To this was added 9.0 g powdered potassium hydroxide. The flask was fitted with a mechanical stirrer and a heating mantle, and heating and stirring were begun. The mixture was held at 150° C. for 2 hours then raised to 250° C. for 1 hour, after which time gas evolution had stopped and heat was shut off. A total of 5.5 g water and low-molecular weight fluorocarbon distilled off during the heating to 250° C.

The distilled reaction product was extracted with Freon TM 113 and filtered through a cake of silica gel and activated carbon. The filter cake was washed several times with Freon TM 113, and the washings and filtered solution combined and evaporated to constant weight on a rotary evaporator. This left 72.9 g clear, colorless liquid which by infrared analysis showed no carbonyl absorption. $^{19}$F NMR spectrometric analysis showed the product to be a composition comprising polyfluoropolyethers represented by Formula V, where $R^1$ was —$CF_3$, $R^2$ was

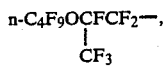

the terminal groups, —$C_jF_{2j}X$, were a mixture of —$CF_3$, —$CF_2CF(CF_3)_2$, —$CF_2H$, and —$CFHCF_3$, the relative distribution being 43 mol %, 8 mol %, 34 mol % and 15 mol %, respectively. In the product g/h was 0.13, i/i' was believed to be between about zero and 0.5, (i+i')/(g+h) was 0.09, and g+h+i+i' was about 15. The presence of incorporated vinyl ether in the polyfluoropolyether chain was provided by observation of $^{19}$F NMR signals at 97 ppm, 81 ppm and 126 ppm upfield from $CFCl_3$. The number average molecular weight was 2700.

The liquid product from the above reaction was heated at 250° C. under a slow stream of $Cl_2$ for 6 hours. After cooling and purging with $N_2$, there remained 70.4 g clear, colorless liquid. $^{19}$F NMR spectroscopy of this product showed a structure mostly unchanged from that of the hydride-terminated starting material, except that the —$CF_2H$ and —$CFHCF_3$ end groups had been replaced by —$CF_2Cl$, —$CFClCF_3$ and —$CF_2CFClCF_3$ end groups. This product (30.1 g) was vacuum distilled into the following cuts.

| CUT | BOILING RANGE | MASS | WT. % |
|---|---|---|---|
| I | 67–100° C./0.1 torr | 0.97 g | 3.3 |
| II | 100–150° C./0.1 torr | 2.59 g | 8.7 |
| III | 150–250° C./0.2 torr | 9.59 g | 32.4 |
| IV | 250–270° C./0.4 torr | 3.84 g | 13.0 |
| Residue | >270° C./0.4 torr | 12.63 g | 42.6 |

$^{19}$F NMR spectrometric analysis of the distillation cuts revealed that the (i+i')/h ratio, indicative of vinyl ether incorporation, was essentially the same in each cut and largely unchanged from that in the unfractionated material.

EXAMPLE 7

To the 2-liter jacketed stainless steel reactor described in Example 4 were added 2720 g hexafluoropropylene and 28 g perfluoro(methyl vinyl) ether. The temperature of the mixture was regulated at —40° C., and a 200-watt Hanovia medium-pressure mercury arc was ignited in the quartz well. A flow of approximately 0.9 g/min. tetrafluoroethylene was begun through a column of activated carbon to remove d-limonene inhibitor, and then mixed with a flow of approximately 2.42 g/min. oxygen. This gas mixture was bubbled through the liquified hexafluoropropylene/perfluoro(-methyl vinyl) ether mixture in the reactor. A reflux condenser operating at —80° C. was used to return unreacted entrained monomers to the reactor while allowing carbonyl fluoride and oxygen to escape. The off-gas stream was scrubbed with aqueous potassium hydroxide solution before venting.

After one hour of photolysis, the gas flows and lamp were turned off, and the reactor contents were collected. Unreacted hexafluoropropylene and other volatile materials were allowed to distill off, leaving behind 347 g clear, colorless fluid.

This liquid product exhibited a $^{19}$F NMR spectrum consistent with a product comprising poly(perfluorooxyalkylenes) represented by Formula III where W was —$CF_3$, Q was —COF, $R^1$ was —F and —$CF_3$, the ratio F/$CF_3$ was 0.89, and $R^2$ was —$CF_3$. In the product, b/c was 0.02, (d+d')/(b+c) was 0.01, e/(b+c+d+d') was 0.35, d/d' was believed to be between about zero and 0.5, and the number average molecular weight was 4450.

EXAMPLE 8

Into the apparatus described in Example 1 were condensed 200 g hexafluoropropylene and 60 g perfluoro(-propyl vinyl) ether ($C_3F_7OCF=CF_2$). Oxygen flow of 13 l/hr through the liquid was started, and the mixture was irradiated for 6 hr. at a temperature of —45° C. with a 100-watt Hanovia medium-pressure mercury lamp. After this period the lamp was shut off, and the reactor contents were allowed to warm to room temperature. Remaining were 48 g colorless liquid. Further removal of volatiles under vacuum left 42 g product. This material exhibited a $^{19}$F NMR spectrum consistent with a product comprising poly(perfluorooxyalkylenes) represented by Formula III in which Q was —COF, $R^1$ was —$CF_3$, $R^2$ was —$C_3F_7$, and W was —$CF_3$. In the product, b/c was 0.50, (d+d')/(b+c) was 0.60, e/(b+c+d+d') was 0.14, d/d' was believed to be between about zero and 0.5, and the number average molecular weight was 3800. Active oxygen content was 1.2 weight percent by iodimetry. No unreacted starting materials were observed in the photoproduct.

Twenty grams of the peroxidic photooxidation product were heated in a sand bath at 250° C. for 12 hr. A total of 2.1 g volatile low-molecular weight species distilled out during the pyrolysis. Remaining in the flask following heat treatment were 11.7 g liquid. Iodimetric and $^{19}$F NMR analysis showed the absence of peroxidic linkages, and infrared analysis showed acid fluoride (—COF) and trifluoromethyl ketone (—$CF_2COCF_3$) end groups to be present. The $^{19}$F NMR data was consistent with a product comprising polyfluoropolyethers represented by Formula VIII in which Q' was —$CF_2COF$, —$CF(CF_3)COF$, and —$COCF_3$, the relative distribution being 58 mol %, 27 mol % and 15 mol %, respectively, $R^1$ was —$CF_3$, $R^2$ was —$C_3F_7$, and W was —$CF_3$, —$C_3F_7$, and —$CF_2CF(CF_3)_2$, the relative distribution being 50 mol %, 38 mol %, and 12 mol %, respectively. In the product, t/u was 0.60, (v+v')/(t+u) was 0.46, v/v' was believed to be between about zero and 0.5, and the number average molecular weight was 1900.

EXAMPLE 9

A peroxidic poly(perfluorooxyalkylene) fluid comprising poly(perfluorooxyalkylenes) represented by Formula III, where Q was —$CF_2COOH$ and —COF, W was —$C_2F_4Cl$, —$CF_2Cl$, and —$CF_3$, the relative proportions of the Q and W being 46 mol % —$CF_2COOH$, 30 mol % —$C_2F_4Cl$, 24 mol % —$CF_2Cl$, and trace amounts of —COF and —$CF_3$, $R^1$ was fluorine, $R^2$ was —$CF_3$, b/c was 0.80, (d+d')/(b+c) was 0.0403, e/(b+c+d+d') was 0.157, d/d' was 2.57, and having a number average molecular weight of 73,000, was prepared by photooxidation of tetrafluoroethylene and perfluoro(methyl vinyl) ether as in Example 4. The peroxidic poly(perfluoroxyalkylene) (222 g) was added by remote control to a reaction vessel equipped with a mechanical stirrer and a nitrogen purge. Inside an explosion-proof barricade, while stirring, the reactor and its contents were heated by remote control at a rate of 0.6° C. per minute to a temperature of 175° C. and held at this temperature for 7¾ hours at which time the temperature was reduced to 25° C. There was obtained a 69% yield of reaction product that had a number average molecular weight of 19,000, and comprised poly(-perfluorooxyalkylenes) represented by Formula III where Q was —$CF_2COOH$ and —COF, W was —$C_2F_4Cl$, —$CF_2Cl$, and —$CF_3$, $R^1$ was fluorine, $R^2$ was —$CF_3$, b/c was 1.27, (d+d')/(b+c) was 0.0469, and e/(b+c+d+d') was 0.0403, and d/d' was 2.60 as determined by $^{19}F$ NMR analysis. The relative distribution of the Q and W end groups was 47 mol % —$CF_2COOH$, 14 mol % —$C_2F_4Cl$, 13 mol % —$CF_2Cl$, and 26 mol % —$CF_3$.

Into a 3-neck round bottom flask equipped with a stirrer, condenser cooled at 0° C., and an addition funnel were placed 40.1 g of the above reduced peroxidic product, 39.3 g Freon TM 113 (1,1,2-trifluoro-2,2,1-trichloroethane), and 6.1 g methanol. The contents of the flask were blanketed by a stream of nitrogen and the mixture heated by a fluid bath to 55° C. When reflux of the contents began, there was added over a 30 minute period a mixture of 12.2 g methanol and 18.7 g of 57% unstabilized hydriodic acid. The mixture was then allowed to reflux for 10 hours, after which it was cooled, the fluorocarbon layer separated and washed three times with an equal volume of sulfur dioxide saturated water and then two times with deionized water. After removal of volatiles by distillation, 32.1 g of diester were obtained that by $^{19}F$ NMR spectral analysis had a number average molecular weight of 2180 and comprised polyfluoropolyethers represented by Formula VI where $R^6$ was —$CF_2COOCH_3$ and —$CF_2COOH$, Y was —$CF_2COOCH_3$, —$CF_2COOH$, —$C_2F_4Cl$, —$CF_2Cl$, and —$CF_3$, R' was fluorine, $R^2$ was —$CF_3$, k/l was 1.40, and (p+p')/(k+l) was 0.0465, and p/p' was 2.48. The relative proportions of the $R^6$ and Y end groups was 87 mol % —$CF_2COOCH_3$, 7 mol % —$CF_2COOH$, 3 mol % —$CF_3$, 1 mol % —$C_2F_4Cl$ and 2 mol % —$CF_2Cl$.

EXAMPLE 10

The procedure of Example 9 was repeated using a hold time of 7.5 hours and a peroxidic poly(perfluorooxyalkylene) fluid comprising poly(perfluorooxyalkylenes) represented by Formula III where Q was —$CF_2COOH$ and —COF, W was —$C_2F_4Cl$, —$CF_2Cl$, and —$CF_3$ with the relative proportions of end groups being 25 mol % —$CF_2COOH$, 10 mol % —COF, 35 mol % —$C_2F_4Cl$, 30 mole % —$CF_2Cl$, and trace amounts of —$CF_3$, $R^1$ was fluorine, $R^2$ was —$CF_3$, b/c was 0.78, (d+d')/(b+c) was 0.0700, e/(b+c+d+d') was 0.151, d/d' was 3.77, and had a number average molecular weight of 55,000. There was obtained a 65% yield of reduced peroxidic product comprising poly(-perfluorooxyalkylenes) represented by Formula III where Q was —$CF_2COOH$ and —COF, W was —$C_2F_4Cl$, —$CF_2Cl$, and —$CF_3$, with relative proportions of the end groups Q and W being 29 mol % —$CF_2COOH$, 23 mol % —COF, 20 mol % —$C_2F_4Cl$, 28 mol % —$CF_2Cl$, and trace amounts of —$CF_3$, $R^1$ was fluorine, $R^2$ was —$CF_3$, b/c was 1.24, (d+d')/(b+c) was 0.0769, e/(b+c+d+d') was 0.0433, d/d' was 2.02, and a number average molecular weight of 24,000.

Thirty grams of the above reduced peroxidic product were treated with hydriodic acid according to the procedure described in Example 9. There were obtained 27.6 grams of polyfluoropolyether dimethyl esters having a number average molecular weight of 2070 and comprising polyfluoropolyesters represented by Formula VI where $R^6$ was —$CF_2COOCH_3$, —$CF_2COOH$, —$C_2F_4Cl$, —$CF_2Cl$, and —$CF_3$, Y was —$CF_2COOCH_3$ and —$CF_2COOH$, $R^1$ was fluorine, $R^2$ was —$CF_3$, k/l was 1.48, (p+p')/(k+l) was 0.0872, and p/p' was 1.87. The relative proportions of the end groups $R^6$ and Y were about 81 mol % —$CF_2COOCH_3$, 8 mol % —$CF_2COOH$, 2 mol % —$CF_2Cl$, 2 mol % —$C_2F_4Cl$, and 7 mol % —$CF_3$.

EXAMPLE 11

The peroxidic reduction procedure of Example 9 was repeated using an 8 hour hold time and a peroxidic poly(perfluorooxyalkylene) liquid comprising poly(perfluorooxyalkylenes) represented by Formula III where $R^1$ was fluorine, $R^2$ was —$C_3F_7$, Q was —$CF_2COOH$ and —COF, W was —$CF_2Cl$ and —$C_2F_4Cl$, b/c was 0.51, (d+d')/(b+c) was 0.0941, e/(b+c+d+d') was 0.206, d/d' was 1.96, and a number average molecular weight of 131,000 that had been prepared as described in Example 4. There was obtained a 31% yield of reduced peroxidic product comprising poly(perfluorooxyalkylenes) represented by Formula III where $R^1$ was fluorine, $R^2$ was —$C_3F_7$, Q was —$CF_2COOH$ and —COF, W was —$C_2F_4Cl$, —$CF_2Cl$, and —$CF_3$, b/c was 1.17, (d+d')/(b+c) was 0.0760, e/(b+c+d+d') was 0.0380, d/d' was 2.03 and a number average molecular weight of 16,000. The relative proportions of the end groups Q and W were 34 mol % —COF, 31 mol % —$CF_2COOH$, 13 mol % —$C_2F_4Cl$, 15 mol % —$CF_2Cl$ and 7 mol % —$CF_3$.

Twenty-one grams of the reduced peroxidic product were treated with hydriodic acid according to the procedure described in Example 9. There were obtained 18.3 g of polyfluoropolyethers comprising polyfluoropolyether dimethyl esters represented by Formula VI where $R^1$ was fluorine, $R^2$ was —$C_3F_7$, $R^6$ was —$CF_2COOCH_3$, —$CF_2COOH$, —$C_2F_4Cl$, —$CF_2Cl$, and —$CF_3$, Y was —$CF_2COOCH_3$ and —$CF_2COOH$, k/l was 1.39 (p+p')/(k+l) was 0.0768, p/p' was 1.90, and a number average molecular weight of 2420. The relative proportions of the end groups $R^6$ and Y was about 90 mol % —$CF_2COOCH_3$, 6 mol % —$CF_2COOH$, 1 mol % —$C_2F_4Cl$, 2 mol % —$CF_2Cl$, and 1 mol % —$CF_3$.

EXAMPLE 12

The peroxidic reduction procedure of Example 9 was repeated using an 8.25 hour hold time and a peroxidic poly(perfluorooxy-alkylene) liquid comprising poly(-perfluorooxyalkylenes) represented by Formula III where Q was —$CF_2COOH$ and —COF, W was —$CF_2Cl$ and —$C_2F_4Cl$, with relative proportions of the end groups being 44 mol % —$CF_2COOH$, 29 mol % —$CF_2Cl$, and 27 mol % —$C_2F_4Cl$, $R^1$ was fluorine, $R^2$ was n—$C_4F_9$, b/c was 0.64, (d+d')/(b+c) was 0.0153, e/(b+c+d+d') was 0.158, d/d' was 3.29, and a number average molecular weight of 91,000, that had been prepared by the photooxidation of a mixture of tetrafluoroethylene and perfluoro(butyl vinyl) ether. There was obtained a 49% yield of reduced peroxidic product comprising poly(perfluorooxyalkylenes) represented by Formula III where Q was —$CF_2COOH$ and —COF, W was $CF_2Cl$ and $C_2F_4Cl$, with relative proportions of the end groups Q and W being 38 mol % —COF, 11 mol % —$CF_2COOH$, 28 mol % —$CF_2Cl$ and 23 mol % —$C_2F_4Cl$, $R^1$ was fluorine, $R^2$ was n—$C_4F_9$, b/c was 1.12, (d+d')/(b+c) was 0.0134, e/(b+c+d+d') was 0.0431, d/d' was 3.23, and a number average molecular weight of 40,000.

Thirty-three grams of the reduced peroxidic product were treated with hydriodic acid according to the procedure described in Example 9. There were obtained 29 grams of polyfluoropolyether dimethyl esters having a number average molecular weight of 2030, and comprising polyfluoropolyether dimethyl esters represented by Formula VI where $R^6$ was —$CF_2COOCH_3$, —$CF_2COOH$, —$C_2F_4Cl$, and —$CF_2Cl$, Y was —$CF_2COOCH_3$ and —$CF_2COOH$, k/l was 1.28, (p+p')/(k+l) was 0.0148, and p/p' was 3.00. The relative proportions of the end groups $R^6$ and Y were 93 mol % —$CF_2COOCH_3$, 4 mol % —$CF_2COOH$, 2 mol % —$CF_2Cl$, and 1 mol % —$C_2F_4Cl$.

EXAMPLE 13

The peroxidic reduction procedure of Example 9 was repeated using a 7.5 hour hold time and a peroxidic poly(perfluorooxyalkylene) fluid having a number average molecular weight of 43,000 and comprising poly(perfluorooxyalkylenes) represented by Formula III where Q was predominately —COF with a trace amount of —$CF_2COOH$, W was —$CF_2Cl$ and —$C_2F_4Cl$, 33 mol % and 67 mol %, respectively, $R^1$ was fluorine, $R^2$ was

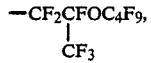

b/c was 0.75, (d+d')/(b+c) was 0.0158, e/(b+c+d+d') was 0.154, and d/d' was 3.0, which had been prepared by photooxidation of a mixture of tetrafluoroethylene and perfluoro(butyloxypropyl vinyl) ether. There was obtained a 65% yield of reduced peroxidic product comprising poly(perfluorooxyalkylenes) represented by Formula III where Q was —COF and —$CF_2COOH$, W was —$C_2F_4Cl$, —$CF_2Cl$, and —$CF_3$, with relative proportions of the end groups Q and W being 9 mol % —COF, 33 mol % —$CF_2COOH$, 15 mol % —$CF_3$, 26 mol % —$CF_2Cl$, and 18 mol % —$C_2F_4Cl$, $R^1$ was fluorine, $R^2$ was

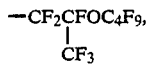

b/c was 1.24, (d+d')/(b+c) was 0.011, e/(b+c+d+d') was 0.0472, d/d' was 2.60, and a number average molecular weight of 16,000.

Thirty-six grams of the reduced peroxidic product were treated with hydroiodic acid according to the procedure described in Example 9. There were obtained 31.6 g of polyfluoropolyether dimethyl esters having a number average molecular weight of 2180 and comprising polyfluoropolyethers represented by Formula VI where $R^1$ was fluorine, $R^2$ was

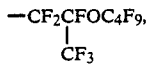

$R^6$ was —$CF_2COOCH_3$, —$CF_2COOH$, —$CF_3$, —$CF_2Cl$, and —$C_2F_4Cl$, Y was —$CF_2COOCH_3$, and —$CF_2COOH$, the relative proportions of the end groups $R^6$ and Y being 89 mol % —$CF_2COOCH_3$, 4 mol % —$CF_2COOH$, 1 mol % —$CF_3$, 3 mol % —$CF_2Cl$, and 3 mol % —$C_2F_4Cl$, k/l was 1.43, (p+p')/(k+l) was 0.0112 and p/p' was 2.83.

EXAMPLE 14

Into a 3-neck round bottom flask equipped with a mechanical agitator, a condenser having circulating fluid at 0° C., and an addition funnel were placed 85 ml tetrahydrofuran, 1.64 g zinc chloride, and 0.88 g sodium borohydride. The flask was purged for several minutes with nitrogen and the flask heated by an fluid bath at 65° C. When reflux began, there was added a solution of 15.0 g of the polyfluoropolyether dimethyl esters of Example 10 in 32 ml of Fluorinert ®FC-75 (a fluorocarbon solvent available from 3M). The mixture was left at reflux for 16 hours. The mixture was allowed to cool to 25° C. and then 12.7 g of 37% aqueous hydrochloric acid were added over a period of 30 minutes. The mixture was stirred for another 30 minutes, the fluorocarbon layer separated and washed two times with an equal volume of deionized water. After stripping off the volatiles at 55° C. under 20 torr, there were obtained 13.3 g of a product comprising polyfluoropolyether diols represented by Formula VI where $R^1$ was fluorine, $R^2$ was —$CF_3$, $R^6$ was —$CF_2CH_2OH$, —$CF_3$, —$CF_2Cl$, and —$C_2F_4Cl$, Y was —$CF_2CH_2OH$, with relative proportions of end groups $R^6$ and Y being 90 mol % —$CF_2CH_2OH$, 6 mol % —$CF_3$, 2 mol % —$CF_2Cl$, and 2 mol % —$C_2F_4Cl$. In the product, k/l was 1.45, (p+p')/(k+l) was 0.0845, p/p' was 1.83, and the number average molecular weight was 2180.

EXAMPLE 15

In a similar manner to that described in Example 14, the diesters of Example 9 were reduced to a product comprising polyfluoropolyether diols represented by Formula VI where $R^1$ was fluorine, $R^2$ was —$CF_3$, $R^6$ was —$CF_2CH_2OH$, —$CF_3$, —$CF_2Cl$, and —$C_2F_4Cl$, Y was —$CF_2CH_2OH$, with relative proportions of end groups $R^6$ and Y being 94 mol % —$CF_2CH_2OH$, 2 mol % —$CF_3$, 2 mol % —$CF_2Cl$, and 2 mol % —$C_2F_4Cl$. In the product, k/l was 1.34, (p+p')/(k+l) was 0.0472, and p/p' was 2.63, and the nunber average molecular weight was 2560.

The polyfluoropolyether diols (13.15 g) were reacted with isocyanatoethyl methacrylate (1.45 g) and a drop of dibutyltin dilaurate to form polyfluoropolyether urethane dimethacrylates. The dimethacrylates were mixed with 0.5 weight percent Darocur TM 1173, available from EM Chemicals, EM Industries Co., then polymerized between two sheets of polyester film by using a 275-watt sunlamp (available from General Electric Company) to form a clear, flexible material suitable for use as contact lens material.

EXAMPLE 16

The procedure of Example 14 was repeated using the polyfluoropolyether dimethyl esters of Example 13 in place of those of Example 10. There were obtained 12.7 g of a product comprising a polyfluoropolyether diol represented by Formula VI where $R^1$ was fluorine, $R^2$ was

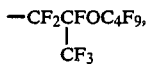

$R^6$ was —$CF_2CH_2OH$, —$CF_3$, —$CF_2Cl$, and —$C_2F_4Cl$, Y was —$CF_2CH_2OH$, with the relative proportions of the end groups $R^6$ and Y being 91 mol % —$CF_2CH_2OH$, 2 mol % —$CF_3$, 4 mol % —$CF_2Cl$, and 3 mol % —$C_2F_4Cl$. In the product, k/l was 1.44, (p+p')/(k+l) was 0.015, p/p' was 2.50, and the number average molecular weight was 2470.

EXAMPLE 17

Into a 50 ml flask equipped with stirrer, thermometer, reflux condenser, and means for maintaining the flask contents under inert gas were placed 1.50 g of a diol product, prepared as described in Example 14, 5 ml of Freon TM 113, 3 ml of glyme, and 0.01 g 18-crown-6 phase transfer catalyst (available form Aldrich Chemical Co.). A flow of argon was initiated and there was added 0.14 g finely crushed potassium hydroxide and 0.50 g allyl benzene sulfonate. The mixture was heated to 45° C. and held at this temperature for 20 hours, during which time a white precipitate formed and after which time, thin layer chromatography indicated that the hydroxyl groups had disappeared. About equal volumes of Freon TM 113 and water were then added, the mixture shaken, the phases separated, the Freon TM phase removed and washed with 10% aqueous sodium bicarbonate, washed with water, and placed over anhydrous magnesium sulfate for 24 hours. The mixture was filtered and solvents were removed by distillation yielding about 1.5 g of clear, colorless, low viscosity fluid. Proton NMR spectroscopy confirmed that the end groups —$CF_2CH_2OH$ had been converted to —$CF_2CH_2OCH_2CH=CH_2$.

EXAMPLE 18

Into a 50 ml flask equipped with stirrer, thermometer, and means for maintaining the flask contents under inert gas were placed 1.2 g of a diol product that was prepared as described in Example 14, 106 mg isocyanatoethyl methacrylate and a small drop of dibutyltin dilaurate. The mixture was heated to 40° C. and held overnight at 30°–40° C. The clear product was extracted with FC-75, treated with a mixture of activated carbon and anhydrous magnesium sulfate, filtered and concentrated to give 1.13 g of a viscous fluid having infrared absorption for NH of 3320 cm$^{-1}$, C—H of 2950 cm$^{-1}$, C=O of 1740 and 1710 cm$^{-1}$, and C=C of 1630 cm$^{-1}$. Proton NMR spectroscopy confirmed that the end groups —$CF_2CH_2OH$ had been converted to

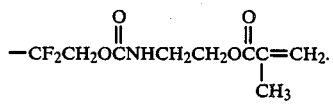

EXAMPLE 19

The procedure of Example 18 was repeated using, in place of isocyanatoethyl methacrylate, 0.37 ml of isocyanatopropyl triethoxysilane. A clear, colorless, low viscosity fluid was obtained. Proton NMR spectroscopy confirmed that the end groups —$CF_2CH_2OH$ had been converted to

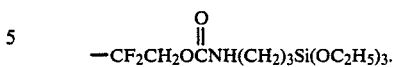

EXAMPLE 20

Into a dry Schlenk tube under argon atmosphere were placed 1.50 g of a diol product, prepared as described in Example 14, and 10 ml Freon TM 113. To this solution was added by syringe 0.24 ml toluene-2,4-diisocyanate and 1 drop of dibutyltin dilaurate. After 3 hours, the mixture was concentrated under vacuum and taken up into 5 ml FC-75. This solution was shaken with anhydrous magnesium sulfate and activated carbon, filtered under argon, and concentrated to a clear colorless, low viscosity fluid product whose viscosity rapidly increased on contact with atmospheric moisture. Infrared spectroscopy indicated the presence of a urethane linkage and isocyanate functionality. Proton NMR spectroscopy confirmed that the end groups —$CF_2CH_2OH$ had been converted to

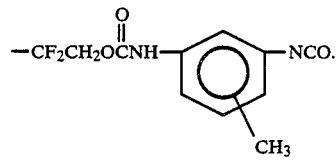

(The isomers being those having the —$CH_3$ in positions 2, 4, and 6.)

EXAMPLE 21

Into a 50 ml flask equipped with a stirrer and means for maintaining the flask contents under inert gas, were placed 1.50 g of a polyfluoropolyether diester product, prepared as described in Example 12, and 124 microliters of allylamine and the mixture was stirred at 24° C. for 18 hours. At the end of this time, infrared spectra of the reaction mixure indicated the disappearance of the ester absorption and appearance of amide absorption at 1700 cm$^{-1}$. The product was dissolved in Freon TM 113, washed with 1% aqueous HCl, washed with water, and dried over anhydrous magnesium sulfate. On removal of solvent, a cloudy fluid was obtained which was dissolved in Fluorinert$^R$ FC-75, treated with activated carbon and magnesium sulfate, filtered, and concentrated to a clear, colorless fluid. Proton NMR spectroscopy showed that the end groups —$CF_2COOCH_3$ had been converted to

EXAMPLE 22

In equipment as described in Example 21 were placed 1.50 g of a polyfluoropolyether diester product prepared as described in Example 9 and 94.8 microliters of 2-aminoethanol and the mixture stirred at 24° C. overnight. The resulting fluid was dissolved in Fluorinert TM FC-75, treated with activated carbon and anhydrous magnesium sulfate, filtered and concentrated to yield a clear colorless fluid. By infrared and proton NMR spectroscopy, the fluid was found to have absorption peaks characteristic of amide NH, —OH, and —CH$_2$— groups indicating that the end groups —CF$_2$COOCH$_3$ had been converted to —CF$_2$$\overset{\overset{O}{\|}}{C}$NHCH$_2$CH$_2$OH.

EXAMPLE 23

The process of Example 22 was repeated using 440 microliters of 3-aminopropyltriethoxysilane in place of the 2-aminoethanol. By infrared spectroscopy, the fluid product was observed to have an amide absorption at 1700 cm$^{-1}$ in place of the ester absorption at 1790 cm$^{-1}$. Proton NMR spectroscopy indicated that the end groups —CF$_2$COOCH$_3$ had been converted to —CF$_2$$\overset{\overset{O}{\|}}{C}$NH(CH$_2$)$_3$Si(OC$_2$H$_5$)$_3$.

EXAMPLE 24

Into a 3 neck round bottom flask, equipped with a stirrer, a condenser cooled at 0° C., and an addition funnel, were placed 5.02 g of a polyfluoropolyether diol product prepared as in Example 15, and 6.17 ml of Freon TM 113 and 0.62 ml of triethylamine. The contents of the flask were blanketed by a stream of nitrogen and a solution of 0.60 ml of acryloyl chloride in 3.05 ml of Freon TM 113 were added over a period of 30 minutes to the contents of the flask. Stirring of the mixture was continued for 16 hours, after which, there was added a solution of 0.27 g triethylamine in 0.22 g water. The mixture was stirred for an additional 30 minutes, the fluorocarbon layer separated and washed two times with 37% hydrochloric acid and two times with deionized water. After removal of volatile materials, analysis of the residual fluid showed the reaction product comprised polyfluoropolyether diacrylates represented by Formula VI where R$^6$ was —CF$_2$CH$_2$O$\overset{\overset{O}{\|}}{C}$CH=CH$_2$, —CF$_3$, —CF$_2$Cl, and —C$_2$F$_4$Cl, Y was —CF$_2$CH$_2$O$\overset{\overset{O}{\|}}{C}$CH=CH$_2$, with relative proportions of the end groups R$^6$ and Y being 92 mol %

—CF$_2$CH$_2$O$\overset{\overset{O}{\|}}{C}$CH=CH$_2$, 2 mol % —CF$_3$, 4 mol % —CF$_2$Cl, and 2 mol % —C$_2$F$_4$Cl, R$^1$ was fluorine, and R$^2$ was —CF$_3$. In the product, k/l was 1.37, (p+p')/(k+l) was 0.0475, p/p' was 2.50, and the number average molecular weight was 3000.

EXAMPLE 25

Into a 100 ml flask equipped with stirrer, reflux condenser, addition funnel and means for excluding moisture were placed a suspension of 3 g lithium aluminum hydride in 30 ml diethyl ether. Then, while stirring the flask contents and cooling the flask with an ice water bath to control heat evolution, there were added over a period of 15 minutes a solution in 30 ml of 1,1,2-trichloro-2,2,1-trifluoroethane (Freon TM 113) of 15.75 g of a composition comprising polyfluoropolyether represented by Formula VIII where R$^1$ was —CF$_3$, R$^2$ was —CF$_3$, Q' was

—CF$_2$CFOCOF, —CFCF$_2$OCOF,
    |            |
    CF$_3$         CF$_3$

—CF$_2$OCOF, and —CF$_3$, W' was a mixture of

—CF$_2$CFOCOF, —CFCF$_2$OCOF,
    |            |
    CF$_3$         CF$_3$ and —CF$_2$OCOF, that had been prepared by heating overnight at 150° C. to remove peroxide linkages from the photooxidation product of a mixture of hexafluoropropene and perfluoro(methyl vinyl) ether prepared as described in Example 1.

After the addition was complete and the evolution of heat had subsided, the mixture was heated at reflux overnight. The mixture was then cooled and 30 ml of water were slowly added to quench the reaction. Precipitated salts were then dissolved by addition of 30 ml of 10% aqueous hydrochloric acid and the product of the reduction reaction was taken up with 100 ml of Freon TM 113. The Freon TM phase was spearated and dried over anhydrous magnesium sulfate. After removal of Freon TM, there were obtained 12.6 g of slightly cloudy, colorless fluid that by $^{19}$F NMR spectrometry had a molecular weight of about 2000. Proton NMR spectrometry indicated that the product comprised a mixture of polyfluoropolyether carbinols represented by Formula VII where R$^1$ was —CF$_3$, R$^2$ was —CF$_3$, R$^7$ and Y were —CF$_3$, —CF$_2$CF(CF$_3$)CF$_3$, —CF$_2$CH(CF$_3$)OH, —CF$_2$CH$_2$OH, and —CF(CF$_3$)CH$_2$OH, the relative proportions of the end groups being 55 mol % —CF$_3$, 41 mol % —CF$_2$CH(CF$_3$)OH, —CF$_2$CH$_2$OH, and —CF(CF$_3$)CH$_2$OH, and 4 mol % —CF$_2$CF(CF$_3$)CF$_3$, and q/r was 0.28, (s+s')/(q+r) was 0.16, and s/s'was 0.27. By thin layer chromatography on silica, the presence of a small amount (20%) of non-functional (—CF$_3$ terminated) material was detected.

EXAMPLE 26

As in the procedure of Example 25, a reduction product comprising polyfluoropolyether carbinols was prepared by adding to 6 g of lithium aluminum hydride in 50 ml of diethyl ether, a solution in 60 ml of Freon TM 113 of 31.8 g of a perfluoropolyether product Formula VIII where R$^1$ was —CF$_3$, R$^2$ was —C$_4$F$_9$, Q' was —CF$_3$, and W' was —CF$_2$$\overset{\overset{O}{\|}}{C}$CF$_3$ or Q', that had been prepared by the photooxidation of a mixture of hexafluoropropene and perfluoro(butyl vinyl) ether as described in Example 3 and heated for 18 hours at 350° C. to remove peroxide linkages and form the ketone end group. There were obtained 29.7 g of a cloudy, colorless fluid that by $^{19}F$ NMR spectroscopy had a number average molecular weight of 4150. NMR spectroscopy was consistent with a product comprising polyfluoropolyethers represented by Formula VII where $R^2$ was —$C_4F_9$, $F^7$ was —$CF_3$, and W was —$CF_2CH(CF_3)OH$ and —$CF_3$. In the product, q/r was 0.11, (s+s')/(q+r) was 0.09, and s/s' was believed to be between about zero and 0.5. By $^{19}F$ NMR spectroscopy a ratio of 0.6 part of terminal —OH to 1.0 part of terminal —$OCF_3$ was found.

EXAMPLE 27

Into a 100 ml flask equipped with a stirrer were placed 20 ml of Freon TM and 9.1 g of a product comprising hydroxyl group- terminated polyfluoropolyethers having pendant perfluoromethoxy groups that was prepared as described in Example 25. There were then added by syringe 0.950 ml (0.690 g) triethylamine and 0.550 ml (0.620 g) acryloyl chloride. A white precipitate began to form immediately. The mixture was stirred overnight, then diluted with 100 ml of Freon TM 113 and washed in a separatory funnel with 100 ml 5% aqueous hydrochloric acid. The aqueous phase was separated and extracted with 50 ml portions of Freon TM 113. The combined Freon TM phases were washed with 5% aqueous sodium hydroxide, the aqueous base phase extracted with Freon TM 113, and the conbined Freon TM phases washed with aqueous sodium chloride and then placed over a mixture of anhydrous magnesium sulfate and activated carbon for 24 hours. The resulting solution was filtered and concentrated to give 7.95 g of a cloudy fluid which was dissolved in 75 ml of Fluorinert ®FC-75 (a perfluorinated solvent available from 3M Company), stored for 24 hours over a mixture of anhydrous magnesium sulfate and activated charcoal, filtered, and concentrated under vacuum to yield 7.83 g of a clear fluid shown by proton NMR spectral analysis to be consistent with a product comprising polyfluoropolyethers represented by Formula VII where $R^2$ was —$CF_3$, $F^7$ was —$CF_3$, Y was

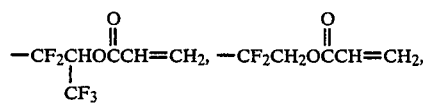

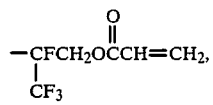

and —$CF_3$ with the relative distribution of the functional end groups, Y, being about 50 mol %

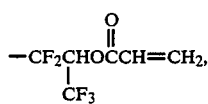

25 mol %

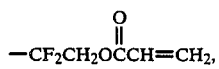

and 25 mol %

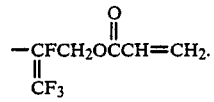

In the product, q/r was 0.15, (s+s')/(q+r) was 0.07, s/s' was 0.27, and the number average molecular weight was 2450.

When the procedure described above was repeated using a product comprising hydroxyl-terminated polyfluoropolyethers having pendant perfluorobutoxy groups instead of the product comprising hydroxyl-terminated polyfluoropolyethers having pendant perfluoromethoxy groups, there was obtained a clear fluid comprising polyfluoropolyethers represented by Formula VII where $R^7$ was —$CF_3$, Y was a mixture of

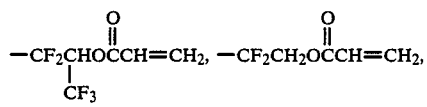

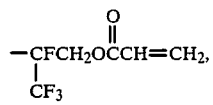

and —$CF_3$ with the relative distribution of the functional end groups Y being about 50 mol %

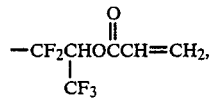

25 mol %

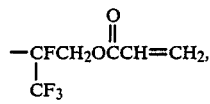

and 25 mol %

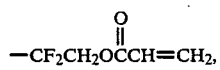

and $R^2$ was —$C_4F_9$. In the product, q/r was 0.17, (s+s')/(q+r) was 0.10, s/s' was believed to be between about zero and 0.5, and the number average molecular weight was 2850.

EXAMPLE 28

Into a 50 ml flask equipped with stirrer, thermometer, reflux condenser, and means for maintaining the flask contents under inert gas were placed 1.50 g of a hydroxyl group-terminated product that was prepared as described in Example 25, 5 ml of Freon TM 113, 3 ml of glyme, and 0.01 g 18-crown-6 phase transfer catalyst (available from Aldrich Chemical Co.). A flow of argon gas was initiated and there were added 0.084 g finely crushed potassium hydroxide and 0.30 g allyl benzene sulfonate. The mixture was heated to 45° C. and held at this temperature for 20 hours during which time a white precipitate formed and after which time, thin layer chromatography indicated that the alcohol had reacted.

Freon TM 113 and water were then added, the mixture shaken, and the phases allowed to separate. The Freon TM 113 phase was separated and washed with 10% aqueous sodium bicarbonate, washed with water, and allowed to dry over anhydrous magnesium sulfate for 24 hours. The mixture was filtered and the solvent removed by distillation to yield a cloudy fluid that was clarified by dissolving in Fluorinert ®FC-75, treating with activated carbon, filtering, and removing solvent. The product comprised polyfluoropolyethers represented by Formula VII where $R^7$ was —$CF_3$, Y was

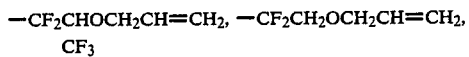

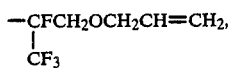

and —$CF_3$, with the relative proportion of the functional end groups Y being about 50 mol %

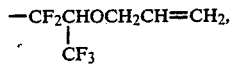

25 mol %

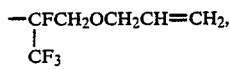

and 25 mol % —$CF_2CH_2OCH_2CH=CH_2$, and $R^2$ was —$CF_3$. In the product, q/r was 0.28, (s+s')/q+r was 0.16, s/s' was 0.29, and the number average molecular weight was about 2200.

EXAMPLE 29

Into a 50 ml flask equipped with stirrer, thermometer, and means for maintaining the flask contents under inert gas were placed 1.2 g of a hydroxyl group-terminated product that was prepared as described in Example 25, 106 mg 2-isocyanatoethyl methacrylate and about 0.05 ml dibutyl tin dilaurate. The mixture was heated to 40° C. and held overnight at 30°–40° C. The clear product was dissolved in Fluorinert ®FC-75, treated with a mixture of activated carbon and anhydrous magnesium sulfate, filtered, and concentrated to give 1.13 g of a viscous fluid having infrared absorption for N—H of 3320 cm$^{-1}$, C—H of 2950 cm$^{-1}$, C=O of 1740 and 1710 cm$^{-1}$, and C=C of 1630 cm$^{-1}$. Proton NMR spectra showed the presence of a product comprising polyfluoropolyethers represented by Formula VII where $R^2$ was —$CF_3$, $R^7$ was —$CF_3$, Y was

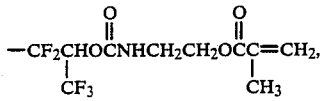

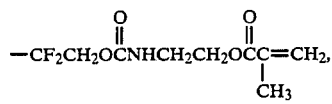

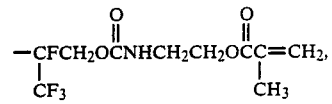

and —$CF_3$ with the relative distribution of the functional end groups Y being about 50 mol %

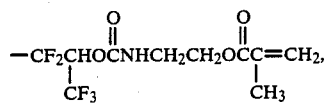

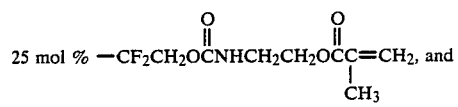

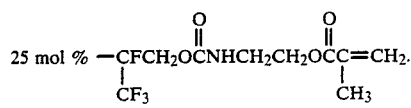

In the product q/r was 0.28, (s+s')/(q+r) was 0.16, s/s' was 0.29, and the number average molecular weight was 2400.

EXAMPLE 30

A polyfluoropolyether carbinol product having pendant perfluorobutoxy groups was prepared following the procedure of Example 25 but substituting perfluoro(butyl vinyl) ether for the perfluoro(methyl vinyl) ether. Into a vial equipped with a mechanical stirrer and means for excluding atmospheric moisture were placed 1.50 g of the polyfluoropolyether carbinol product, 170 mg of 3-isocyanatopropyl triethoxysilane, and 1 drop dibutyl tin dilaurate as catalyst. The mixture was stirred overnight, after which time a single clear viscous phase had formed. The product was dissolved in Fluorinert ®FC-75, treated with anhydrous magnesium sulfate and activated carbon, filtered, and concentrated to give 1.1 g of clear vixcous fluid. Proton and $^{19}F$ NMR spectra were consistent with a product comprising polyfluoropolyethers having pendant perfluorobutoxy groups and terminal triethoxysilyl groups and represented by Formula VII where $R^2$ was —$C_4F_9$, $R^7$ was —$CF_2CF(CF_3)_2$ and —$CF_3$, Y was

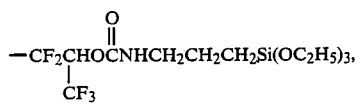

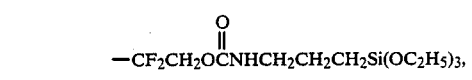

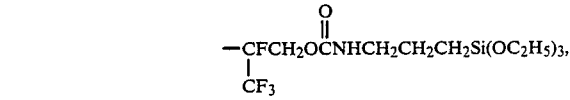

—$CF_2CF(CF_3)_2$ and —$CF_3$. The relative distribution of the end groups was 44 mol %

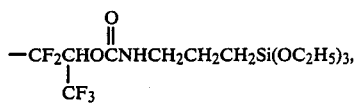

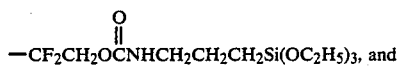

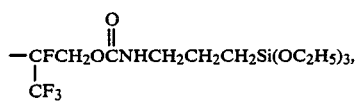

52 mol % —CF₃, 4 mol % —CF₂CF(CF₃)₂, the distribution of functional end groups was about 50 mol %

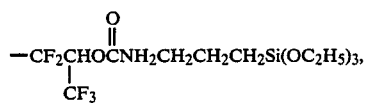

25 mol %

and 25 mol %

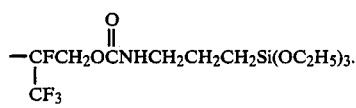

In the product, q/r was 0.17, (s+s')/(q+r) was 0.10, s/s' was believed to be between about zero and 0.5, and the number average molecular weight was 3000.

EXAMPLE 31

The procedure of Example 30 was repeated using, in place of 3-isocyanatopropyl triethoxysilane, 0.32 g of 2,4-toluenediisocyanate. Proton NMR and infrared spectra on the clear colorless fluid obtained were consistent with a product comprising polyfluoropolyethers having pendant perfluorobutoxy groups and terminal isocyanate groups represented by Formula VII and similar to that of Example 30 except that the functional end groups Y were

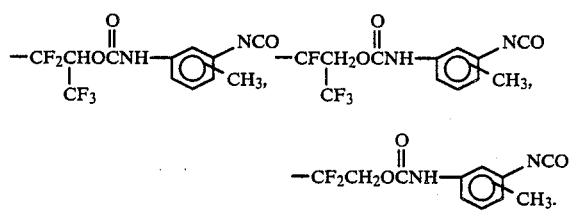

(The isomers being those having the —CH₃ in positions 2, 4, and 6.)

EXAMPLE 32

Into a 3-neck round bottom flask equipped with a mechanical agitator, a condenser having circulating fluid at 0° C., and an addition funnel were placed 255 ml tetrahydrofuran, 5.13 g zinc chloride, and 2.67 g sodium borohydride. The flask was purged for several minutes with nitrogen and the flask heated by a fluid bath at 65° C. When reflux began, there were added a solution, in 90 ml of fluorinert ®FC-75 solvent, of 59.4 g of a polyfluoropolyether dimethyl ester which by ¹⁹F NMR spectral analysis had a number average molecular weight of 1760 and comprised the polyfluoropolyether represented by Formula VI where R⁶ was —CF₂COOCH₃ and —CF₂COOH, Y was —CF₂COOCH₃, —CF₂COOH, —C₂F₄Cl, —CF₂Cl, and —CF₃, R' was fluorine, R² was —C₄F₉, k/l was 1.64 and (p+p')/(k+l) was 0.0131. The relative proportions of the R⁶ and Y end groups were 90 mol % —CF₂COOCH₃, 6 mol % —CF₂COOH, 1 mol % —CF₃, 2 mol % —C₂F₄Cl and 1 mol % —CF₂Cl. The mixture was left at reflux for 16 hours. The mixture was allowed to cool to 25° C. and then 330 ml of 1N hydrochloric acid were added over a period of 30 minutes. The mixture was stirred for another 30 minutes, the fluorocarbon layer separated and washed two times with an equal volume of deionized water. After stripping off the volatiles at 55° C. under 20 torr, there were obtained 52.0 g of a product containing a polyfluoropolyether diol having an average structure of Formula VI where R¹ was fluorine, R² was C₄F₉, R⁶ was —CF₂CH₂OH, —CF₃, —CF₂Cl, and —C₂F₄Cl, Y was —CF₂CH₂OH, with relative proportions of end groups R⁶ and Y being 96 mol % —CF₂CH₂OH, 2 mol % —CF₂Cl, and 2 mol % —C₂F₄Cl. In the product, k/l was 1.62, (p+p')/(k+l) was 0.0153 and the number average molecular weight was 1920.

EXAMPLE 33

This example demonstrates improved release properties towards silicone pressure sensitive adhesives obtained with two different coatings comprising acrylate-functional polyfluoropolyether compositions of this invention ("PPE acrylates" II and III prepared as in Example 27) having perfluoro(methyl vinyl) ether incorporated into the polyether chains, represented by Formula VII where R² was —CF₃, R⁷ was —CF₃, and Y was

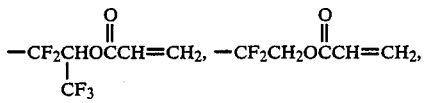

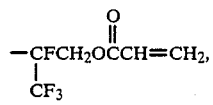

and —CF₃. For comparison, a similar acrylate-functional polyfluoropolyether composition ("PPE acrylate" I) having no vinyl ether incorporated into the polyether chain was prepared. The number average molecular weight and the ratios q/r and (s+s')/(q+r) of the three acrylate compositions are shown in Table I.

TABLE II

| PPE acrylate | q/r | (s + s')/(q + r) | M̄n |
|---|---|---|---|
| I | .04 | 0 | 2250 |
| II | .15 | .07 | 2450 |
| III | .28 | .16 | 2100 |

Each polyfluoropolyether acrylate was coated onto a polyester film from a 1 weight percent solution in FC-77 (a fluorochemical solvent available from 3M Company) using a No. 3 wire-wound Mayer bar. Evaporation of solvent left dried polyfluoropolyether coatings with calculated thickness of about 700 Å. The polyfluoropolyether coatings were passed under a pair of medium pressure mercury lamps at about 120 watts per cm using an ultraviolet processor from PPG Industries, Model QC 1202 AN3IR, with a web speed of 18.5 m/min and a nitrogen atmosphere.

The photocured release coatings were laminated with a poly(dimethylsiloxane) pressure sensitive adhesive tape (MacDermid P-3, 0.05 mm adhesive thickness, available from MacDermid Company). Initial release peel force was measured for each laminate at a peel angle of 180° and peel speed of 2.3 m/min using an Imass Slip/Peel Tester, model SP-102B-3M90. After the release peel test, readhesion peel force on glass was measured for the silicone adhesive tape using the same peel conditions. A second set of laminates was aged at 70° C. for 3 days before testing for release peel force and readhesion peel force in the same manner. Peel test results are shown in Table III. The adhesion peel force for the tape to glass without prior lamination to the release coating was 436 g/cm.

TABLE III
PEEL TEST RESULTS

| PPE acrylate Coating | Initial | | Aged 3 days 70° C. | |
|---|---|---|---|---|
| | Release Peel Force (g/cm) | Readhesion Peel Force (g/cm) | Release Peel Force (g/cm) | Readhesion Peel Force (g/cm) |
| I | 6.9 | 424 | 11.0 | 413 |
| II | 5.1 | 436 | 8.7 | 413 |
| III | 3.4 | 424 | 6.3 | 402 |

As can be seen from the results in Table III, the presence of the perfluoromethoxy groups resulting from the incorporated perfluoro(methyl vinyl) ether provided a significant reduction in release peel force with little or no reduction in readhesion peel force.

EXAMPLE 34

The polyfluoropolyether acrylates I-III of Example 33 were also coated onto polyester film which had been previously coated with a hydantoin hexacrylate (HHA) priming layer. The release coatings were prepared in a manner similar to Example 33 but using lower lamp power (80 watts/cm). The HHA primed film was prepared by coating a 5 weight percent solution of hydantoin hexacrylate in methylethylketone containing 5 weight percent 2,4-bis(trichloromethyl)-6-(3,4-dimethoxyphenyl)-3-triazine, based on the weight of the HHA, onto polyester film using a No. 3 wired-wound Mayer bar. The dried HHA coatings were lightly cured using a PPG ultraviolet processor, model QC 1202 NA3IR, with 40 watts/cm lamp power, 50 m/min. web speed and air atmosphere. Release and readhesion peel forces for laminates made with poly(dimethylsiloxane) pressure sensitive adhesive tape (MacDermid P-3) were measured in the same manner described in Example 33. These results are reported below in Table IV. The adhesion peel force for the tape to glass without prior lamination to the release coating was 435 g/cm.

TABLE IV

| HHA Primed PPE acrylate Coating | Initial | | Aged 3 days 70° C. | |
|---|---|---|---|---|
| | Release Peel Force (g/cm) | Readhesion Peel Force (g/cm) | Release Peel Force (g/cm) | Readhesion Peel Force (g/cm) |
| I | 23 | 424 | 18 | 413 |
| II | 18 | 435 | 13 | 402 |
| III | 12 | 424 | 10 | 402 |

As can be seen from the results in Table IV, the presence of the perfluoromethoxy groups resulting from the incorporated perfluoro(methyl vinyl) ether provided a significant reduction in release peel force with little or no reduction in readhesion peel force.

EXAMPLE 35

This example demonstrates a release coating useful for solvent cast peroxide-cured silicone pressure-sensitive adhesives comprising polyester film coated with acrylate functional polyfluoropolyether represented by formula VII where $R^2$ was $-CF_3$, $R^7$ was $-CF_3$, Y was

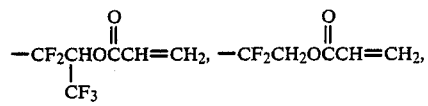

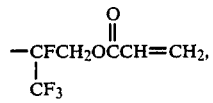

and $-CF_3$, q/r was 0.15, (s+s')/(q+r) was 0.07 and the number average molecular weight was about 2450. The polyfluoropolyether acrylate was coated onto a polyester film from a 0.75 weight percent solution in Fluorinert ®FC-77 (a fluorochemical solvent available from 3M Company) using a No. 3 wire-wound Mayer bar. Evaporation of solvent left dried polyfluoropolyether coatings with calculated thickness of about 525 Å. The polyfluoropolyether coatings were passed under a pair of medium pressure mercury lamps at 120 watts/cm using an ultraviolet processor from PPG Industries, Model QC 1201 AN3IR, with a web speed of 18.5 m/min and a nitrogen atmosphere.

The photocured release coatings were solvent coated with two silicone pressure-sensitive adhesives (DC-280A, a poly(dimethyl siloxane) pressure-sensitive adhesive available from Dow-Corning Company and GE-518 Silgrip, a phenyl-containing polysiloxane pressure-sensitive adhesive available from General Electric Company). Both adhesives were coated from 33 weight percent solutions in xylene-toluene solvent also containing 1.7 weight percent/weight adhesive Cadox TS-50 peroxide catlayst (2,4-dichlorobenzoyl peroxide in silicone paste available from Noury Chemical Corporation) using a knife coater with 0.3 mm orifice. The coatings were dried for 10 minutes at 70° C. leaving adhesive coatings of approximately 0.05 mm thickness on the polyfluoropolyether coatings. The adhesives were cured at 150° C. for 5 minutes and the cured coatings were laminated to 0.05 mm polyester film. The laminated polyester backing was used to measure the release peel force for peeling the cured adhesives from the polyfluoropolyether coatings. Initial release peel force was measured at a peel angle of 180° and peel speed of 2.3 m/min using an Imass slip/peel tester, Model SP- 102B-3M90. After the release peel test, readhesion peel force on glass was measured for the silicone adhesives on the polyester backing using the same peel conditions. In the same manner, release peel force and readhesion peel force were measured after aging the laminates at 70° C. for 3 days. Peel test results are shown in Table V. For comparison, each adhesive was applied, as described above, to polyester film having no polyfluoropolyether coating thereon to form pressure-sensitive adhesive tapes. Each tape was tested for adhesion to glass as described above. The adhesion of the DC-280A adhesive was 702 g/cm. The adhesion of the GE-518 adhesive was 619 g/cm.

TABLE VI

| Sample | Absolute viscosity n(cp, 25° C.) | Structural parameters[1] MW$_n$ | b/c | e/b + c |
|---|---|---|---|---|
| 1 | 1163 | 15600 | 1.10 | 0.032 |
| 2 | 1828 | 21000 | 1.37 | 0.071 |
| 3 | 1891 | 22000 | 1.16 | 0.027 |
| 4 | 2314 | 22000 | 0.96 | 0.095 |
| 5 | 15380 | 39000 | 1.03 | 0.16 |
| 6 | 13900 | 42000 | 0.63 | 0.24 |
| 7 | 34563 | 48000 | 0.64 | 0.18 |

[1]See Formula III: d = 0, d' = O, R$^1$ = F

TABLE VII

| Sample | Absolute viscosity n(cp, 25° C.) | Predicted viscosity (cp, 25° C.) | Structural parameters[1] MW$_n$ | b/c | (d + d')/(b + c + d + d') | e/(b + c + d + d') | R$^2$ |
|---|---|---|---|---|---|---|---|
| 8 | 1718 | 2828 | 23000 | 1.27 | 0.034 | 0.052 | CF$_3$ |
| 9 | 999 | 3221 | 24000 | 1.37 | 0.064 | 0.055 | CF$_3$ |
| 10 | 27435 | 97971 | 73000 | 0.57 | 0.055 | 0.32 | n-C$_4$F$_9$ |
| 11 | 59415 | 723287 | 140000 | 0.52 | 0.10 | 0.31 | n-C$_4$F$_9$ |

[1]See Formula III: R$^1$ = F; d/d'~2

TABLE V

| | Initial | | Aged 3 days 70° C. | |
|---|---|---|---|---|
| Silicone Adhesive | Release Peel Force (g/cm) | Readhesion Peel Force (g/cm) | Release Peel Force (g/cm) | Readhesion Peel Force (g/cm) |
| DC-280A | 25 | 740 | 26 | 761 |
| GE-518 | 20 | 717 | 19 | 677 |

As can be seen from the data in Table V, the presence of the perfluoro(methyl vinyl) ether provided excellent release peel force with excellent retention of adhesion peel force.

EXAMPLE 36

(Viscosity/Molecular Weight Relationships)

For a variety of polyfluoropolyether peroxide materials prepared by photooxidation of tetrafluoroethylene both in the presence and absence of pendant perfluoroalkoxy groups, number average molecular weights were measured using endgroup analysis obtained from $^{19}$F NMR spectra. For the same materials, absolute viscosities were measured at 25° C. using a Brookfield model RVTDCP cone-and-plate viscometer. These data and the structural parameters for the materials are given in Tables VI and VII.

For the control materials not containing pendent perfluoroalkoxy groups, the viscosities and molecular weights (Table VI) can be correlated with the equation $$n = KM^a \quad (1)$$

where n=absolute viscosity (cp) at 25° C., M=number average molecular weight, K=1.15×10$^{10}$, a=3.07. The regression coefficient r$^2$ for the correlation is 0.97.

Table VII shows molecular weights, measured viscosities, and predicted viscosities from equation (1) for tetrafluoroethylene-based polyfluoropolyether peroxides containing pendant perfluoroalkoxy groups. The measured viscosities are significantly lower than would be predicted using data for control materials, and the deviation from predicted viscosity increases with increasing concentrations of pendant perfluoroalkoxy groups (Table VII, entries 8, 9, and 11).

Various modifications and alterations of this invention will become apparent to those skilled in the art without departing from the scope of the invention.

What is claimed is:

1. Perfluoropolyether compositions comprising (1) normally liquid peroxidic poly(perfluorooxyalkylene) compositions comprising a mixture of peroxidic poly(perfluorooxyalkylene) compounds, each compound comprising a backbone of randomly distributed, perfluorooxyalkylene units represented by the formulas —CF$_2$O—,

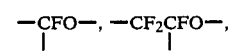

and —O—, which, when bonded to an —O— of any of the perfluorooxyalkylene units, forms a peroxy group, —O—O—, which imparts the peroxidic characteristics to the composition, and backbone-pendant perfluoroalkoxy groups, the terminal ether oxygen atoms of which are bonded to carbon atoms of the

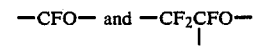

backbone units; (2) derivatives of the poly(perfluorooxyalkylene) compositions comprising a mixtures of non-peroxidic polyfluoropolyether compounds; and (3) derivatives of the non-peroxidic polyfluoropolyether compounds comprising functional and non-functional polyfluoropolyether compounds.

2. Compositions according to claim 1 wherein said backbone is represented by the formula

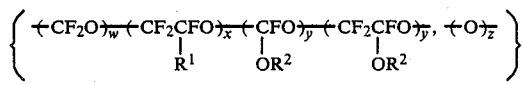

where
each R$^1$ is independently a fluorine or a perfluoroalkyl group selected from linear, branched, and cyclic groups;

each $OR^2$ is independently a perfluoroalkoxy group wherein $R^2$ is a perfluoroalkyl group or a perfluoroalkyl group substituted with one or more further ether oxygen atoms;

w is a number representing the average number of $+CF_2O+$ units randomly distributed within the chain and has a value of 1 or greater;

x is a number representing the average number of

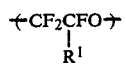

units randomly distributed within the chain and has a value of 1 or greater;

y and y' are each a number representing the average number of

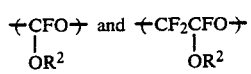

units; respectively, randomly distributed within the chain, the sum of y and y' having a value of 1 or greater, and the ratio y/y' being 0 to 5;

z is a number representing the average number of oxygen atoms, $+O+$, randomly distributed within the chain which when bonded to an —O— of the $+CF_2O+$,

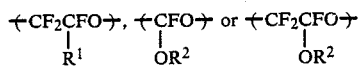

forms a peroxy group, —O—O—, and has a value of 0 or greater;

the ratio w/x is 5 or less;
the ratio (y+y')/(w+x) is 0.01 to 1.5; and
the ratio z/(w+x+y+y') is 0 to 1.

3. Poly(perfluorooxyalkylene) compositions according to claim 2 wherein $R^2$ is independently selected from units having the structure $+R^3O+_fR^4$, in which each $R^3$ is independently selected from —$CF_2$—, —$CF_2CF_2$—, and

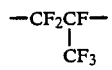

and $R^4$ is a perfluoroalkyl group selected from linear, branched, and cyclic groups, and f is zero or a number having a value of 1 to 6.

4. Poly(perfluorooxyalkylene) compositions according to claim 2 wherein w is 1 to about 10,000; x is 1 to about 10,000, and the sum of y and y' is 1 to about 800; and z is 0 to about 5000.

5. Poly(perfluorooxyalkylene) compositions according to claim 2 wherein said ratio (y+y')/(w+x) is 0.05 to 1.5.

6. Poly(perfluorooxyalkylene) compositions according to claim 2 wherein said compounds have a number average molecular weight of about 650 to 1,000,000.

7. Polyfluoropolyether compositions according to claim 1 comprising polyfluoropolyethers represented by the formula

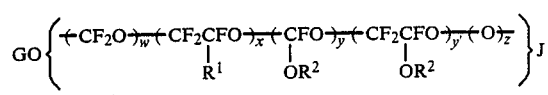

where
each $R^1$ is independently a fluorine or a perfluoroalkyl group selected from linear, branched, and cyclic groups;

each $OR^2$ is independently a perfluoroalkoxy group wherein $R^2$ is a perfluoroalkyl group or perfluoroalkyl group substituted with one or more further ether oxygen atoms, independently selected from units having the structure $+R^3O+_fR^4$, in which each $R^3$ is independently selected from —$CF_2$—, —$CF_2CF_2$— and

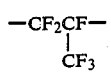

and $R^4$ is a perfluoroalkyl group selected from linear, branched, and cyclic groups, and f is zero or a number having a value of 1 to 6;

w is a number representing the average number of $+CF_2O+$ units randomly distributed within the chain and has a value of 1 or greater;

x is a number representing the average number of

units randomly distributed within the chain and has a value of 1 or greater;

y and y' are each a number representing the average number of

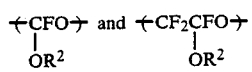

units, respectively, randomly distributed withn the chain, the sum of y and y' having a value of 1 or greater, and the ratio y/y' being 0 to 5;

z is a number representing the average number of oxygen atoms, $+O+$, randomly distributed within the chain which when bonded to an —O— of the $+CF_2O+$,

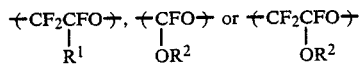

forms a peroxy group, and has a value of 0 or greater;
the ratio w/x is 5 or less;
the ratio (y+y')/(w+x) is 0.01 to 1.5;
the ratio z/(w+x+y+y') is 0 or 1;
when z is zero, G and J are independently selected from —$C_jF_{2j}X$ in which X is hydrogen or halogen and when X is hydrogen, then j is 1 or 2, and when X is halogen, then j is a integer of 1 to 5, or G and J are terminal functional groups which can enter into an addition or condensation reaction to form a homopolymer or copolymer, and when z is 1 or greater, and when z is zero, G is selected from —COF, —$CF_2COF$,

—CF$_2$COCF$_3$, —CF$_2$C(OH)$_2$CF$_3$,

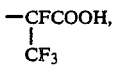

and —CF$_2$COOH and J is selected from —COF, —CF$_2$COF,

—CF$_2$COCF$_3$, —CF$_2$C(OH)$_2$CF$_3$,

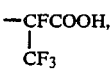

—CF$_2$COOH, —C$_a$F$_{2a+1}$ and —C$_a$F$_{2a}$Cl where a is an integer of 1 to 5; and
the number average molecular weight of the polyfluoropolyether is from about 650 to 1,000,000.

8. Peroxidic poly(perfluorooxyalkylene) compositions according to claim 1 comprising peroxidic poly(perfluorooxyalkylenes) represented by the formula

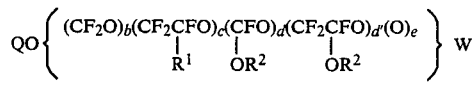

wherein
Q is selected from —COF, —CF$_2$COF, and —CF$_2$COOH;
W is a terminal group selected from Q and —C$_a$F$_{2a+1}$ and —C$_a$F$_{2a}$Cl where a is an integer up to 5;
each R$^1$ is independently a fluorine or a perfluoroalkyl group selected from linear, branched, and cyclic groups;
each OR$^2$ is independently a perfluoroalkoxy group wherein R$^2$ is a perfluoroalkyl group or perfluoroalkyl group substituted with one or more further ether oxygen atoms independently selected from units having the structure (R$^3$O)$_f$R$^4$, in which each R$^3$ is independently selected from —CF$_2$—, —CF$_2$CF$_2$— and

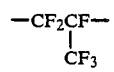

and R$^4$ is a perfluoroalkyl group selected from linear, branched, and cyclic groups, and f is zero or a number having a value of 1 to 6; and
b is a number representing the average number of (CF$_2$O) units randomly distributed within the chain and has a value of 1 or greater;
c is a number representing the average number of

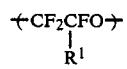

units randomly distributed within the chain and has a value of 1 or greater;
d and d' are each a number representing the average number of

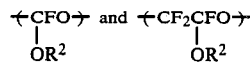

units, respectively, randomly distributed within the chain, the sum of d and d' has a value of 1 or greater and the ratio d/d' is 0 to 5;
e is a number representing the average number of (O) units randomly distributed within the chain and has a value of 1 or greater;
the ratio b/c is less than 5;
the ratio (d+d')/(b+c) is 0.01 to 1.5; the ratio e/(b+c+d+d') is 0.0001 to 1; and the number average molecular weight of the poly(perfluorooxyalkylene) is from about 650 to 1,000,000.

9. Compositions comprising the mixtures of non-peroxidic polyfluoropolyethers compounds according to claim 1, which compounds are represented by the formula

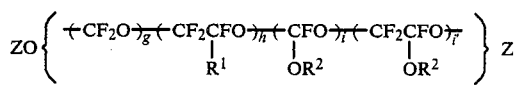

wherein
each Z is independently a terminal group which is a functional group Y which is or contains a functional moiety which can enter into an addition or condensation reaction to form a polymer, or Z is a non-functional group —C$_j$F$_{2j}$X in which X is hydrogen or halogen and when X is hydrogen, then j is 1 or 2, and when X is halogen, then j is an integer of from 1 to 5;
each R$^1$ is independently a fluorine or a perfluoroalkyl group selected from linear, branched, and cyclic groups;
each OR$^2$ is independently a perfluoroalkoxy group wherein R$^2$ is a perfluoroalkyl group or perfluoroalkyl group substituted with one or more further ether oxygen atoms, independently selected from units having the structure (R$^3$O)$_f$R$^4$, in which each R$^3$ is independently selected from —CF$_2$—, —CF$_2$CF$_2$— and

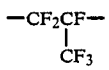

and R$^4$ is a perfluoroalkyl group selected from linear, branched, and cyclic groups, and f is zero or a number having a value of 1 to 6, and
g is a number representing the average number of (CF$_2$O) units randomly distributed within the chain and has a value of 1 or greater;
h is a number representing the average number of

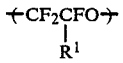

units randomly distributed within the chain and has a value of 1 or greater;
i and i' are each a number representing the number of

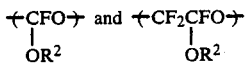

units, respectively, distributed within the chain, the sum of i and i' has a value of 1 or greater and i/i' is 0 to 5;

the ratio g/h is less than 5;

the ratio (i+i')/(g+h) is 0.01 to 1.5; and the number average molecular weight of the polyfluoropolyether is from about 650 to 20,000.

10. Non-functional polyfluoropolyether compounds according to claim 1 comprising non-periodic polyfluoropolyethers represented by the formula

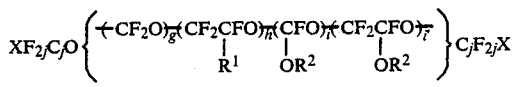

each X is hydrogen or halogen and when X is hydrogen, then j is 1 or 2, and when X is halogen, then j is an integer of from 1 to 5;

each $R^1$ is independently a fluorine or a perfluoroalkyl group selected from linear, branched, and cyclic groups;

each $OR^2$ is independently a perfluoroalkoxy group wherein $R^2$ is a saturated perfluoroalkyl group or perfluoroalkyl group substituted with one or more further ether oxygen atoms, independently selected from units having the structure $-(R^3O)_fR^4$, in which each $R^3$ is independently selected from $-CF_2-$, $-CF_2CF_2-$ and $$-CF_2CF- \atop | \atop CF_3$$

and $R^4$ is a perfluoroalkyl group selected from linear, branched, and cyclic groups, and f is zero or a number having a value of 1 to 6, and g is a number representing the average number of $-(CF_2O)-$ units randomly distributed within the chain and has a value of 1 or greater;

h is a number representing the average number of

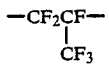

units randomly distributed within the chain and has a value of 1 or greater;

i and i' are each a number representing the average number of

units, respectively, randomly distributed within the chain, the sum of i and i' has a value of 1 or greater and i/i' is 0 to 5;

the ratio g/h is less than 5;

the ratio (i+i')/(g+h) is 0.01 to 1.5; and the number average molecular weight of the polyfluoropolyether is 650 to 20,000.

11. Functional polyfluoropolyether compounds according to claim 1 comprising non-peroxidic polyfluoropolyethers represented by the formula

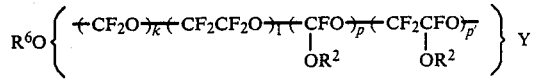

where

Y is any terminal functional group which is or contains a functional moiety which can enter into an addition or condensation reaction to form a homopolymer or copolymer;

$R^6$ is Y, a perfluoroalkyl group, or a haloperfluoroalkyl group;

each $OR^2$ is independently a perfluoroalkoxy group wherein $R^2$ is a perfluoroalkyl group or perfluoroalkyl group substituted with one or more further ether oxygen atoms, independently selected from units having the structure $-(R^3O)_fR^4$, in which each $R^3$ is independently selected from $-CF_2-$, $-CF_2CF_2-$ and $$-CF_2CF- \atop | \atop CF_3$$

and $R^4$ is a perfluoroalkyl group selected from linear, branched, and cyclic groups, and f is zero or a number having a value of 1 to 6;

k is a number representing the average number of $-(CF_2O)-$ units randomly distributed within the chain and has a value of 1 to 200;

l is a number representing the average number of $-(CF_2CF_2O)-$ units randomly distributed within the chain and has a value of 1 to 200;

p and p' are each a number representing the average number of

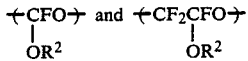

units, respectively, randomly distributed within the chain, the sum of p and p' has a value of 1 to 50, and p/p' is 0 to 5;

the ratio k/l is less than 5;

the ratio (p+p')/(k+l) is 0.01 to 1.5; and the number average molecular weight of the polyfluoropolyether is from about 650 to 20,000.

12. The polyfluoropolyethers of claim 11 wherein $R^6$ is Y.

13. The polyfluoropolyethers of claim 11 wherein the functional moiety is selected from $-OH$, $-SH$, $-NHR^9$, $-COOR^8$, $-SiR^8_aR^{10}_{3-a}$, $-CN$, $-NCO$,

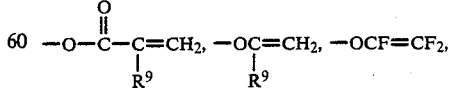

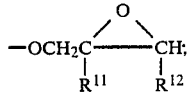

$-OSO_2CF_3$, $-OCOCl$, $-OCN$, $-N(R^8)CN$,

—N≡C, —I, —CHO, —CH(OCH$_3$)$_2$, —SO$_2$Cl, —C(OCH$_3$)=NH, and —C(NH$_2$)=NH, wherein R$^8$ is lower alkyl or phenyl, R$^9$ is hydrogen or R$^8$, R$^{10}$ is a hydrolyzable group, α is an integer of 1 to 3, R$^{11}$ and R$^{12}$ are independently hydrogen or lower alkyl of 1 to 4 carbon atoms or R$^{11}$ and R$^{12}$ together are alkylene and with carbons to which they are attached form a carbocyclic ring of 5 to 6 carbon atoms.

14. The polyfluoropolyethers of claim 13 wherein said functional moiety is linked to the

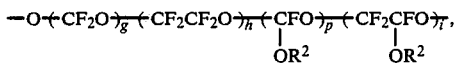

by the linking group —CF$_2$CH$_2$—.

15. The polyfluoropolyethers of claim 14 wherein said functional moiety is selected from

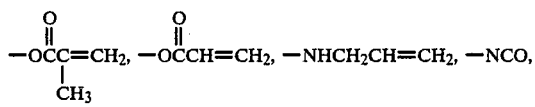

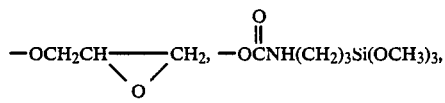

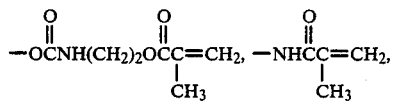

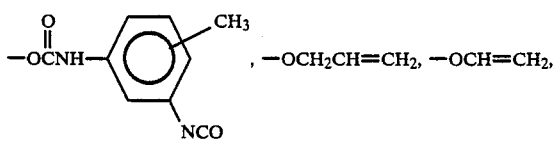

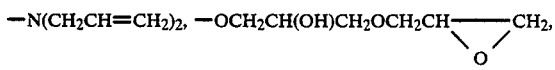

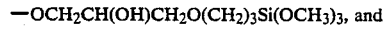

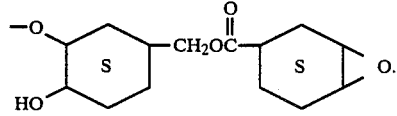

16. The polyfluoropolyethers of claim 11 wherein the functional moiety is selected from —OCH=CH$_2$, —NHCH$_2$CH$_2$OH, —N(CH$_2$CH$_2$OH)$_2$, —OCH$_2$CH=CH$_2$, —NHCH$_2$CH=CH$_2$, —N(CH$_2$CH=CH$_2$)$_2$,

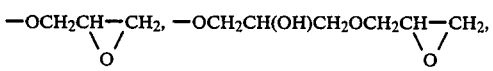

—NH(CH$_2$)$_3$Si(OCH$_3$)$_3$, and —OCH$_2$CH(OH)CH$_2$O(CH$_2$)$_3$Si(OCH$_3$)$_3$ and the functional group is linked to the

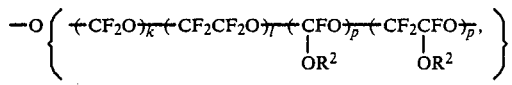

by linking group

17. Functional polyfluoropolyether compounds according to claim 1 comprising non-peroxidic polyfluoropolyethers represented by the formula

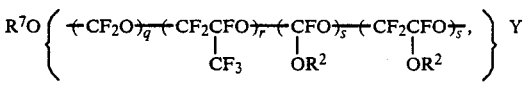

wherein

Y is a terminal functional group which is or contains a functional moiety;

R$^7$ is a perfluoroalkyl group, haloperfluoroalkyl, or the terminal functional group Y;

each OR$^2$ is independently a perfluoroalkoxy group wherein R$^2$ is a saturated perfluoroalkyl group or perfluoroalkyl group substituted with one or more further ether oxygen atoms, independently selected from units having the structure $+R^3O+_fR^4$, in which each R$^3$ is independently selected from —CF$_2$—, —CF$_2$CF$_2$— and

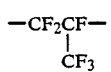

and R$^4$ is a perfluoroalkyl group selected from linear, branched, and cyclic grops, and f is zero or a number having a value of 1 to 6;

q is a number representing the average number of +CF$_2$O+ units randomly distributed within the chain and has a value of 1 up to about 50;

r is a number representing the average number of

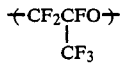

units randomly distributed within the chain and has a value of 5 up to about 50;

s and s' are each a number representing the average number of

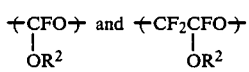

units, respectively, randomly distributed within the chain, the sum of s and s' has a value of 1 up to about 50, and the ratio s/s' is 0 to 5;

the ratio q/r is 0.01 to 1.0;

the ratio (s+s')/(q+r) is 0.01 to 1.0; and the number average molecular weight of the polyfluoropolyether is from about 650 to 10,000.

18. The polyfluoropolyethers of claim 17 wherein R$^7$ is a perfluoroalkyl group.

19. The polyfluoropolyethers of claim 17 wherein $R^7$ is selected from —CF$_3$, —CF$_2$CF$_3$, and —CF$_2$CF(CF$_3$)$_2$.

20. The polyfluoropolyethers of claim 17 wherein the functional moiety is selected from —OH, —SH, —NHR$^9$, —COOR$^8$, —SiR$^8{}_a$R$^{10}{}_{3-a}$, —CN, —NCO,

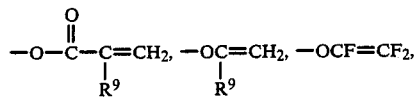

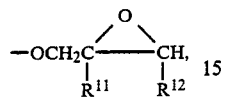

—OSO$_2$CF$_3$, —OCOCl, —OCN, —N(R$^8$)CN,

—N≡C, —I, —CHO, —CH(OCH$_3$)$_2$, —SO$_2$Cl, —C-(OCH$_3$)=NH, —C(NH$_2$)=NH, and the like, wherein $R^8$ is lower alkyl or phenyl, $R^9$ is hydrogen or $R^8$, $R^{10}$ is a hydrolyzable group $a$ is an integer of 1 to 3, $R^{11}$ and $R^{12}$ are independently hydrogen or lower alkyl of 1 to 4 carbon atoms or $R^{11}$ and $R^{12}$ together are alkylene and with carbons to which they are attached form a carbocyclic ring of 5 to 6 carbon atoms.

21. The polyfluoropolyethers of claim 17 wherein said functional moiety is linked to the

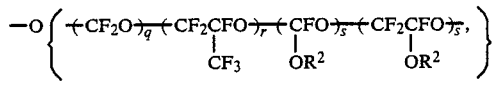

by linking groups selected from —CF$_2$CH$_2$—,

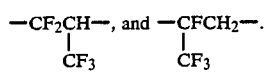

22. The polyfluoropolyethers of claim 17 wherein said linking group is —CF$_2$CH$_2$—,

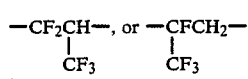

and the terminal functional moiety is selected from

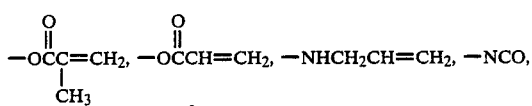

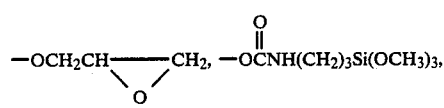

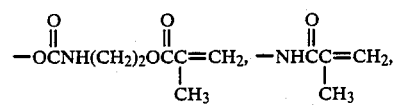

-continued

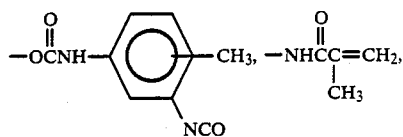

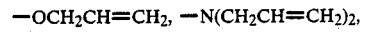

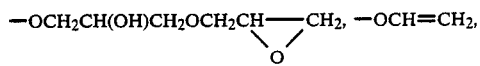

—OCH$_2$CH(OH)CH$_2$O(CH$_2$)$_3$Si(OCH$_3$)$_3$, and

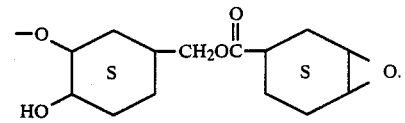

23. The composition of claim 11 wherein Y is —CF$_2$COOCH$_3$ and $R^2$ is —CF$_3$, —C$_2$F$_5$, C$_3$F$_7$, or —C$_4$F$_9$.

24. The composition of claim 11 wherein Y is —CF$_2$CH$_2$OH or 17 wherein Y is —CF$_2$CH$_2$OH,

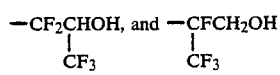

and $R^2$ is —CF$_3$, —C$_2$F$_5$, —C$_3$F$_7$, or C$_4$F$_9$.

25. The composition of claim 11 wherein Y is

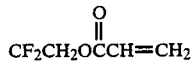

or 17 wherein Y is

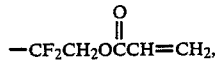

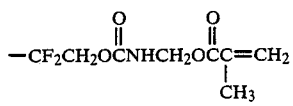

and $R^2$ is —CF$_3$, —C$_2$F$_5$, —C$_3$F$_7$, or —C$_4$F$_9$.

26. The composition of claim 11 wherein Y is

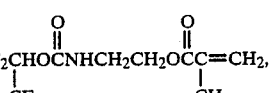

or 17 wherein Y is

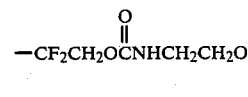

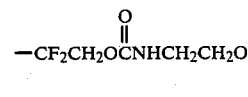

-continued

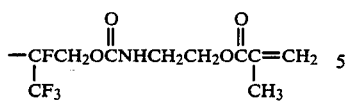

and $R^2$ is $-CF_3$, $-C_2F_5$, $-C_3F_7$, or $-C_4F_9$.

27. The functional polyfluoropolyether compounds according to claim 11 or 17 wherein said functional moiety is hydroxyl, ester, acrylate, methacrylate, or substituted silane.

28. A polymer having a backbone comprising randomly distributed, perfluorooxyalkylene units represented by the formulas $-CF_2O-$,

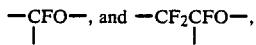

and backbone-pendant perfluoroalkoxy groups, the terminal ether oxygen atoms of which are bonded to carbon atoms of the $-\underset{|}{C}FO$ and $-CF_2\underset{|}{C}FO$ backbone units.

29. A release agent comprising a polymerized, functional polyfluoropolyether composition of claim 1.

30. The release agent of claim 29 wherein said functional polyfluoropolyether composition comprises the polyfluoropolyethers of claim 11 or 17.

* * * * *

UNITED STATES PATENT AND TRADEMARK OFFICE
CERTIFICATE OF CORRECTION

PATENT NO. : 4,743,300
DATED : May 10, 1988
INVENTOR(S) : Brinduse et al.

It is certified that error appears in the above-identified patent and that said Letters Patent is hereby corrected as shown below:

Col. 4, line 66, "-O-" should be -- $(O)$ -- .

Col. 15, line 51, "-SiR$^8_\alpha$R$^{10}_{3-}$," should be -- -SiR$^8_\alpha$R$^{10}_{3-\alpha}$, -- .

Col. 43, line 42, "-CF$_3$,F$^7$ was" should be -- -CF$_3$,R$^7$ was -- .

Col. 48, line 3, "fluorinert®" should be -- Fluorinert® -- .

Col. 51, line 58, "K=1.15x10$^{10}$," should be -- K=1.15x10$^{-10}$, -- .

Col. 59, line 17, "-O$(CF_2O)_g(CF_2CF_2O)_h(CFO)_p(CF_2CFO)_i$,"
$\qquad\qquad\qquad\qquad\qquad\qquad\qquad\quad |\qquad\quad\ |$
$\qquad\qquad\qquad\qquad\qquad\qquad\qquad\ OR^2\qquad OR^2$ should be -- -O$(CF_2O)_g(CF_2CF_2O)_h(CFO)_p(CF_2CFO)_{p'}$, -- .
$\qquad\qquad\qquad\qquad\qquad\qquad\qquad\quad |\qquad\quad\ |$
$\qquad\qquad\qquad\qquad\qquad\qquad\qquad\ OR_2\qquad OR_2$ Col. 60, line 40, "grops" should be -- groups -- .

Signed and Sealed this

Twenty-first Day of February, 1989

Attest:

DONALD J. QUIGG

Attesting Officer   Commissioner of Patents and Trademarks